United States Patent
Bodkin et al.

(10) Patent No.: US 8,903,750 B1
(45) Date of Patent: Dec. 2, 2014

(54) ADAPTIVE LEARNING NETWORK FOR FUSION OF REMAINING USEFUL LIFE WITH MACHINERY CONDITION

(75) Inventors: Michael A. Bodkin, Orlando, FL (US); Gregory A. Harrison, Oviedo, FL (US); Sreerupa Das, Oviedo, FL (US); Richard M. Hall, Orlando, FL (US); Eric W. Worden, Orlando, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 258 days.

(21) Appl. No.: 13/591,697

(22) Filed: Aug. 22, 2012

Related U.S. Application Data

(60) Provisional application No. 61/530,789, filed on Sep. 2, 2011, provisional application No. 61/622,141, filed on Apr. 10, 2012.

(51) Int. Cl.
   *G06F 15/18* (2006.01)
(52) U.S. Cl.
   USPC .......................................................... 706/14
(58) Field of Classification Search
   None
   See application file for complete search history.

(56) References Cited

U.S. PATENT DOCUMENTS

| | | | |
|---|---|---|---|
| 7,734,443 B2 | 6/2010 | De et al. | |
| 7,797,062 B2 * | 9/2010 | Discenzo et al. | 700/28 |
| 8,082,115 B2 * | 12/2011 | Bechhoefer et al. | 702/34 |
| 8,285,438 B2 | 10/2012 | Mylaraswamy et al. | |
| 2011/0043536 A1 | 2/2011 | Cobb et al. | |
| 2011/0167024 A1 * | 7/2011 | Maldonado Diaz et al. | 706/10 |

OTHER PUBLICATIONS

Klesk, Przemyslaw, "Construction of a Neurofuzzy Network Capable of Extrapolating (and Interpolating) With Respect to the Convex Hull of a Set of Input Samples in Rn," IEEE Transactions on Fuzzy Systems, Oct. 2008, pp. 1161-1179, vol. 16, No. 5.

Rejer, Izabela et al., "A Hypertube as a Possible Interpolation Region of Neural Model," Proceedings of the 8th International Conference on Artificial Intelligence and Soft Computing, Lecture Notes in Computer Science, Jun. 25-29, 2006, pp. 123-132, vol. 4029, Zakopane, Poland, Springer-Berlin Heidelberg.

Reynolds, Tom et al., "Analysis of Separation Minima Using a Surveillance State Vector Approach," 3rd USA/Europe Air Traffic Management R&D Seminar, Jun. 13-16, 2000, 10 pages, Napoli, Italy.

Xu, Rui et al., "Neural Network-Based Clustering," Clustering (book), Chapter 5, Oct. 2009, pp. 111-162, Wiley-IEEE Press, Hoboken, NJ.

(Continued)

*Primary Examiner* — Kakali Chaki
*Assistant Examiner* — Mai T Tran
(74) *Attorney, Agent, or Firm* — Withrow & Terranova, PLLC

(57) ABSTRACT

Estimating a remaining useful life (RUL) of an apparatus is disclosed. A computer device may obtain a priori RUL data of an apparatus. The a priori RUL data identifies a priori RULs values of the apparatus as a function of time. Buckets are then defined in the a priori RUL data, wherein each of the buckets corresponds to a different set of the a priori RUL values in the a priori RUL data. An operational event indicator may then be obtained for the apparatus that indicates a current operational event of the apparatus. The RUL of an apparatus is estimated by determining probability values throughout a time period. Probability values are then determined based on the operational event indicator where each probability value quantifies a probability that a current RUL value of the first apparatus is within one of the buckets.

14 Claims, 12 Drawing Sheets

(56) References Cited

OTHER PUBLICATIONS

Non-final Office Action for U.S. Appl. No. 13/434,072 mailed Mar. 10, 2014, 38 pages.
Abbas, M. et al., "A hierarchical framework for fault propagation analysis in complex systems," AUTOESTCON, 2009, 6 pages.
Budde, C. et al., "Impact damage detection for fiberglass composite rotor blade," Proceedings of the Annual Forum of the American Helicopter Society, May 2009, 11 pages.
Carpenter, G.A. et al., "Fuzzy Art: fast stable learning and categorization of analog patterns by an adaptive resonance system," Neural Networks, vol. 4, 1991, pp. 759-771.
Chung, Y. et al., "Application of phase detection frequency domain reflectometry for locating faults in an F-18 flight control harness," IEEE Transactions on Electromagnetic Compatibility, vol. 47, No. 2, 2005, pp. 327-334.
Department of Defense, "Condition based maintenance plus (CBM+) for materiel maintenance," No. 4151.22, Dec. 2, 2007, 11 pages.
Deriche, M. "Bearing fault diagnosis using wavelet analysis," Computers, Communication & Signal Processing Conference, 2005, pp. 197-201.
Friswell et al., "Crack identification in rotating machines with active bearings," Proceedings of the ISMA, 2010, pp. 2843-2855.
Hale, B., "An alternative vision for CBM+ for the Air Force," Air Force Journal of Logistics, Jun. 2005 vol. XXVIV, No. 1.
Harrison, G.A. et al., "CBM+ system for ship condition monitoring," Fourteenth International Ship Control Systems Symposium, Ottawa, Canada, Sep. 21-23, 2009, 10 pages.
Hochmann, D. et al., "Envelop bearing analysis: theory and practice," Aerospace Conference, 2005, pp. 3658-3666.
Jaw. L.C. et al., "CBM+ research environment—facilitating technology development, experimentation, and maturation," IEEE Aerospace Conference, 2008, 6 pages.
Karakowski, J. et al., "A fuzzy hypercube artificial neural network classifier," Research and Development Technical Report CECOM-TR-98-4, U.S. Army Communcations—Electronics Command, Oct. 1998, 47 pages.
Kautz, W.H., "Testing for faults in wiring networks," IEEE Transactions on Computers, vol. C-23, Iss. 4, 1974, pp. 358-363.
Kohonen, T., "Self-Organizing Feature Maps," in Self-Organization and Associative Memory, New York, Springer-Verlag, 1988, pp. 119-137.
Lebold, M. et al., "Review of vibration analysis methods for gearbox diagnostics and prognostics," Proceedings of the 53rd meeting of the Society for Machinery Failure Prevention Technology, May 14, 2000, pp. 623-634.
Schubert, L. et al., "Structural health monitoring of a rotor blade during statical load test," 18th International Conference on Database and Expert Systems Applications, 2007, pp. 297-301.
Wan, S. et al., "The fault diagnosis method of rolling bearing based on wavelet packet transform and zooming envelop analysis," International Conference on Wavelet Analysis and Pattern Recognition, vol. 3, 2007, pp. 1257-1261.
U.S. Army, "CBM+ Roadmap," Dec. 13, 2007, 83 pages.
Watola, D. et al., "Automated Downlink Analysis for the Deep Space Network," NASA TDA Progress Report 42-126, Aug. 15, 1996, http://ipnpr.jpl.nasa.gov/progress_report/42-126/126F.pdf, 19 pages.
Non-Final Office Action for U.S. Appl. No. 13/434,072, mailed Sep. 3, 2014, 40 pages.
Non-Final Office Action for U.S. Appl. No. 13/472,547, mailed Aug. 15, 2014, 21 pages.

* cited by examiner

ADAPTIVE LEARNING NETWORK FOR FUSION OF REMAINING USEFUL LIFE WITH MACHINERY CONDITION

RELATED APPLICATIONS

This application claims the benefit of provisional patent application Ser. No. 61/530,789, filed Sep. 2, 2011, and provisional patent application Ser. No. 61/622,141, filed Apr. 10, 2012, the disclosures of which are hereby incorporated herein by reference in their entirety.

FIELD OF THE DISCLOSURE

Embodiments of the present disclosure relate to methods and systems for estimating a remaining useful life (RUL) of an apparatus.

BACKGROUND

Estimating a remaining useful life (RUL) value of an apparatus, such as a vehicle, machine, or vehicle chassis, is often a very difficult task, one which often leads to inaccurate results. For example, the RUL value of an apparatus is often estimated utilizing an RUL curve. The RUL curve is prepared using historical data regarding a population of the same types of apparatuses. The RUL curve provides an estimate of the RUL value as a function of time. The estimated RUL value of the apparatus is determined based on the RUL value that corresponds to the current time. Unfortunately, no manufacturing process can make every apparatus exactly the same. Inherently, there will be at least slight physical, electrical, and/or chemical differences for every apparatus and apparatus component. Given the physical, electrical, and/or chemical differences between different manufactured apparatuses, the RUL curve can only generalize the behavior of a population of the same types of apparatuses. Consequently, the RUL value of the specific apparatus is often not estimated with sufficient precision. Inaccurate estimations of RUL value lead to wasted resources because apparatus and apparatus components are repaired or replaced when in actuality neither was necessary. On the other hand, inaccurate estimations of the RUL value can lead to dangerous situations when apparatus or apparatus components continue to be used despite actually needing repair or replacement. Furthermore, variations in environmental and internal factors, such as operating temperature, can change dynamically thereby affecting the RUL value of an apparatus.

Therefore, there is a need for more accurate systems and methods of estimating the RUL value of an apparatus. In this manner, the RUL value of the apparatus can be accurately estimated so that maintenance for the apparatus can be planned ahead of time (prior to failure of the apparatus but not when the apparatus is not in need of repair or replacement).

SUMMARY

The disclosure relates generally to systems and methods for estimating a remaining useful life (RUL) value of an apparatus. Embodiments of the systems and methods may be implemented with a computer device. The computer device obtains a priori RUL data describing a priori RUL values that each identify an a priori RUL of the apparatus as a function of time. Various buckets may be defined within the a priori RUL data by the computer device. Each bucket corresponds to a different set of the a priori RUL values where each set of the a priori RUL values corresponds to a different time segment of the time period. To estimate the RUL value of the apparatus, the computer device may obtain an operational event indicator that indicates a current operational event of the apparatus. Based on the operational event indicator, probability values may be determined for each of the buckets. The probability values quantify a probability that a current RUL value identifying a current RUL of the first apparatus is within one of the buckets.

In one embodiment, a bucketing factor representing a maximum variance may be utilized to define the buckets within the a priori RUL data. The sets of the a priori RUL values are determined so that each of the sets has a set variance less than or equal to the bucketing factor. A mean RUL value can be calculated for the set of each bucket. With regard to the operational event indicator, the operational event indicator may have an operational event value to indicate the current operation event of the apparatus. In this embodiment, the probability quantified by each of the probability values may be a conditional probability that the current RUL value corresponds to the mean RUL value given that the first operation event indicator has a first operation event value to indicate the current operational event. Furthermore, since each of the buckets is determined so that the set variance is less than the bucket factor, the probability values are each quantifying the conditional probability that the current RUL value of the apparatus is within the bucketing factor of the mean RUL value for a respective bucket.

In some embodiments, the computer device may visually represent the probability values on a display device so that personnel can make maintenance decisions regarding the apparatus. For example, the buckets of the a priori RUL data correlating with repair may be associated with low probabilities. Personnel may therefore decide to delay maintenance on the apparatus. On the other hand, if the buckets that are correlated with repair have high probabilities, personnel may perform maintenance earlier than scheduled.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

Figure 3:
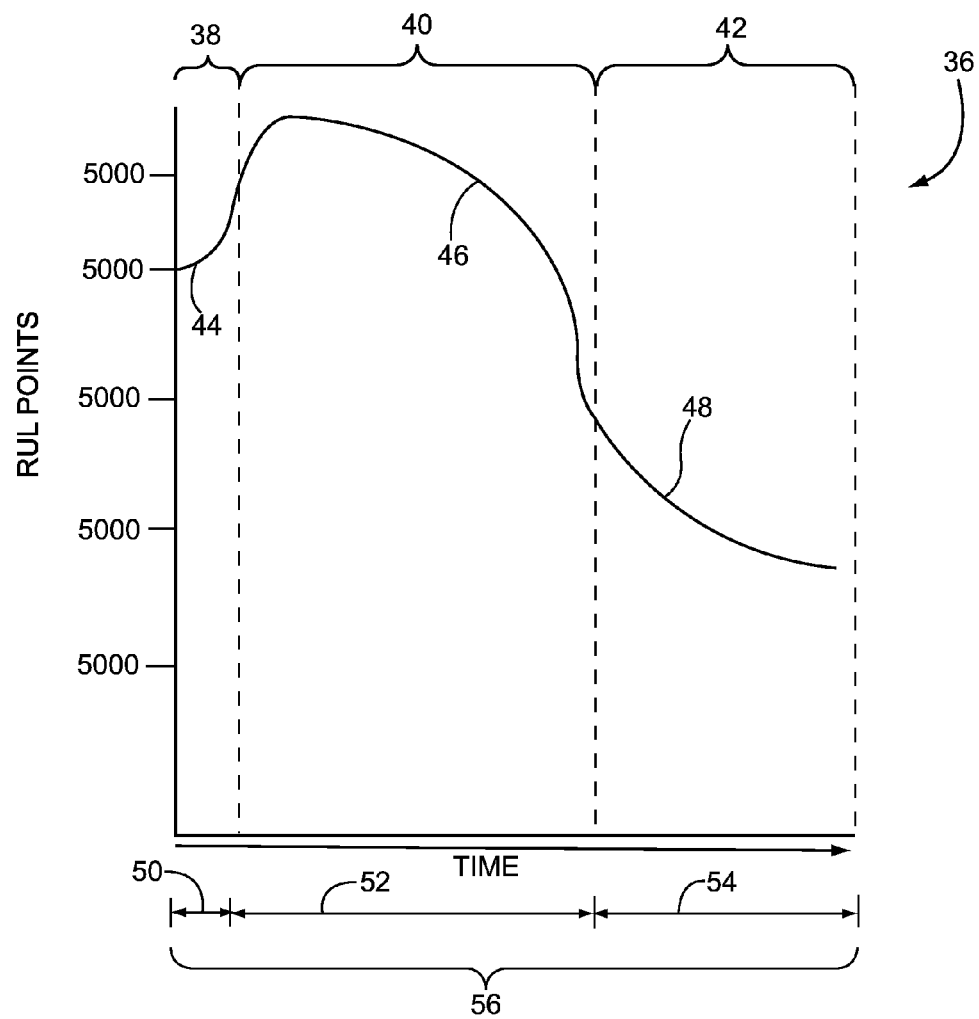

FIG. 3 visually expresses one embodiment of a priori RUL data for an apparatus.

Figure 2:
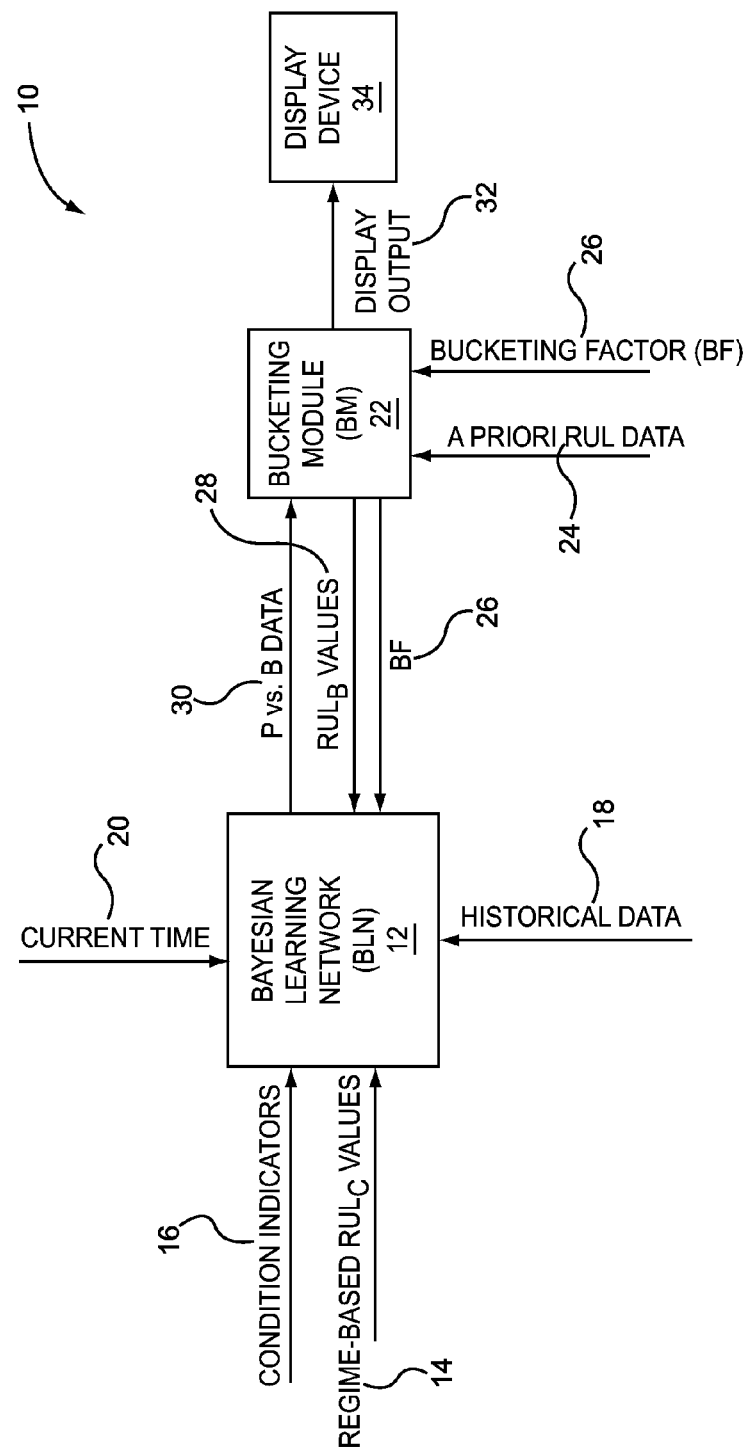
FIG. 2 is a block diagram of an embodiment of a RUL estimation module configured to estimate the RUL of various apparatuses in accordance with the method illustrated in FIG. 1. The RUL estimation module in FIG. 2 includes a Learning Network to determine probability values.
Figure 4:
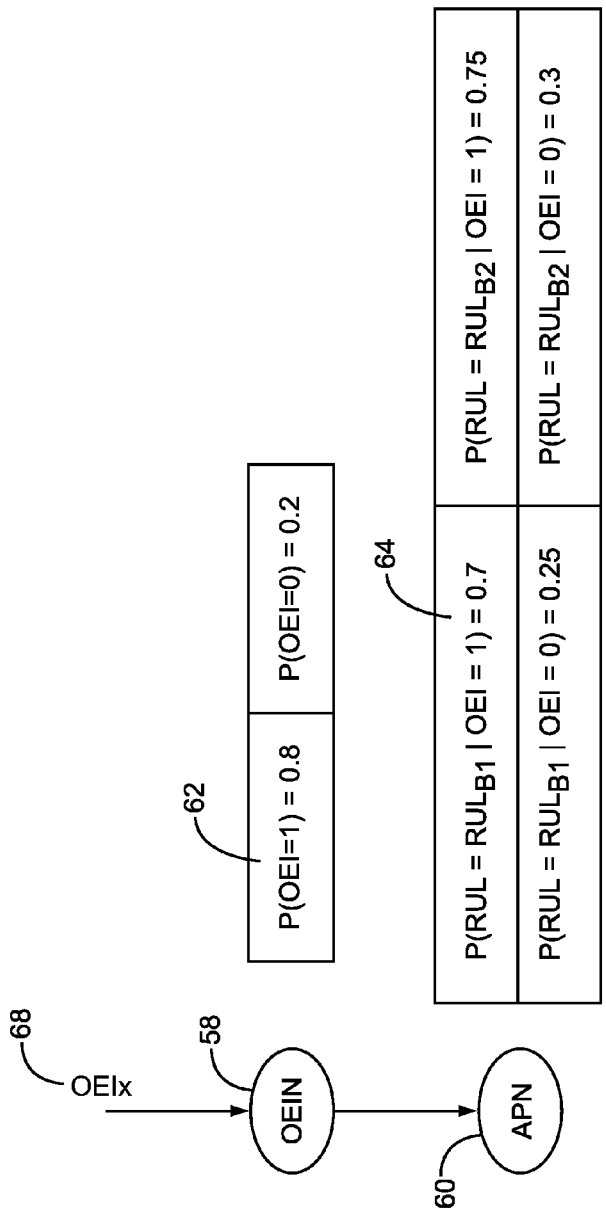

FIG. 4 illustrates one embodiment of a set of probability nodes in the Learning Network shown in FIG. 2 and corresponding probability tables.

Figure 5:
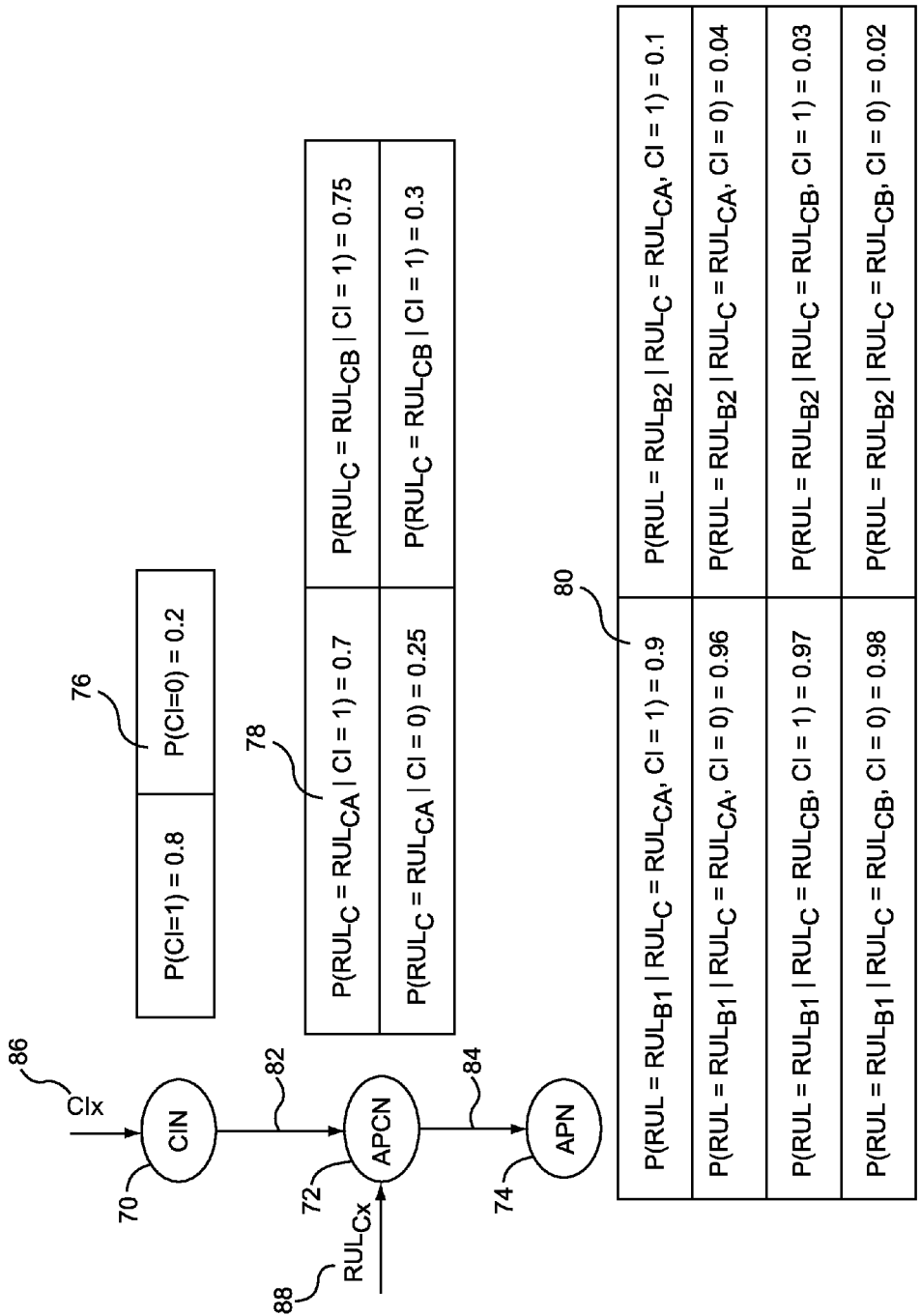

FIG. 5 illustrates another embodiment of a set of probability nodes in the Learning Network shown in FIG. 2 and corresponding probability tables.

Figure 6:
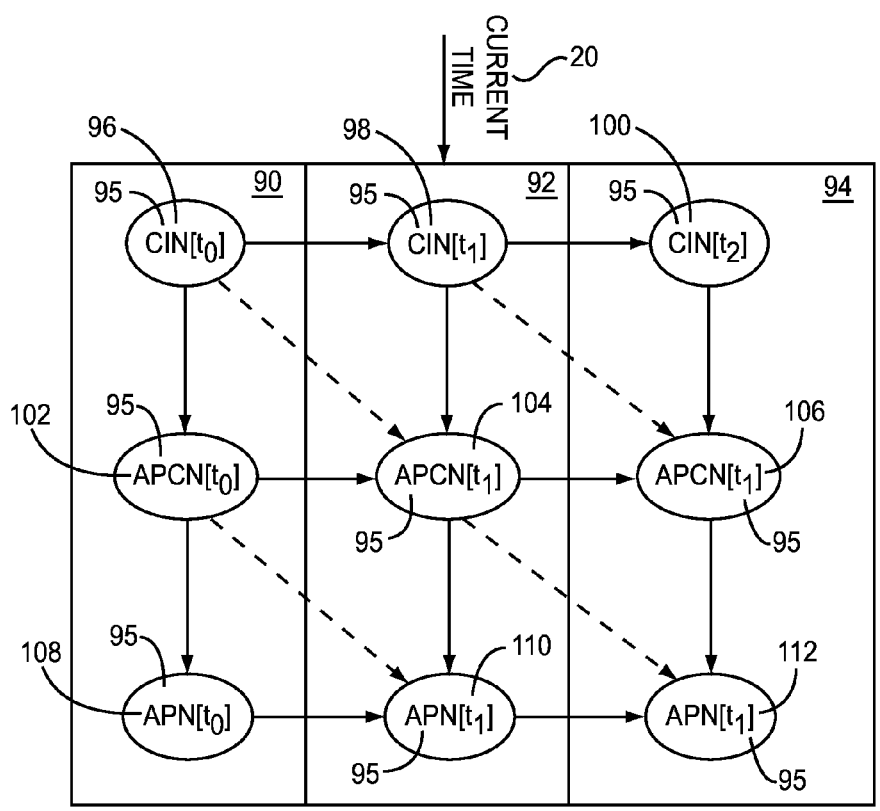

FIG. 6 illustrates another embodiment of various sets of probability nodes in the Learning Network shown in FIG. 2 where the sets of probability nodes have been configured to go forward and backward in time.

Figure 7:
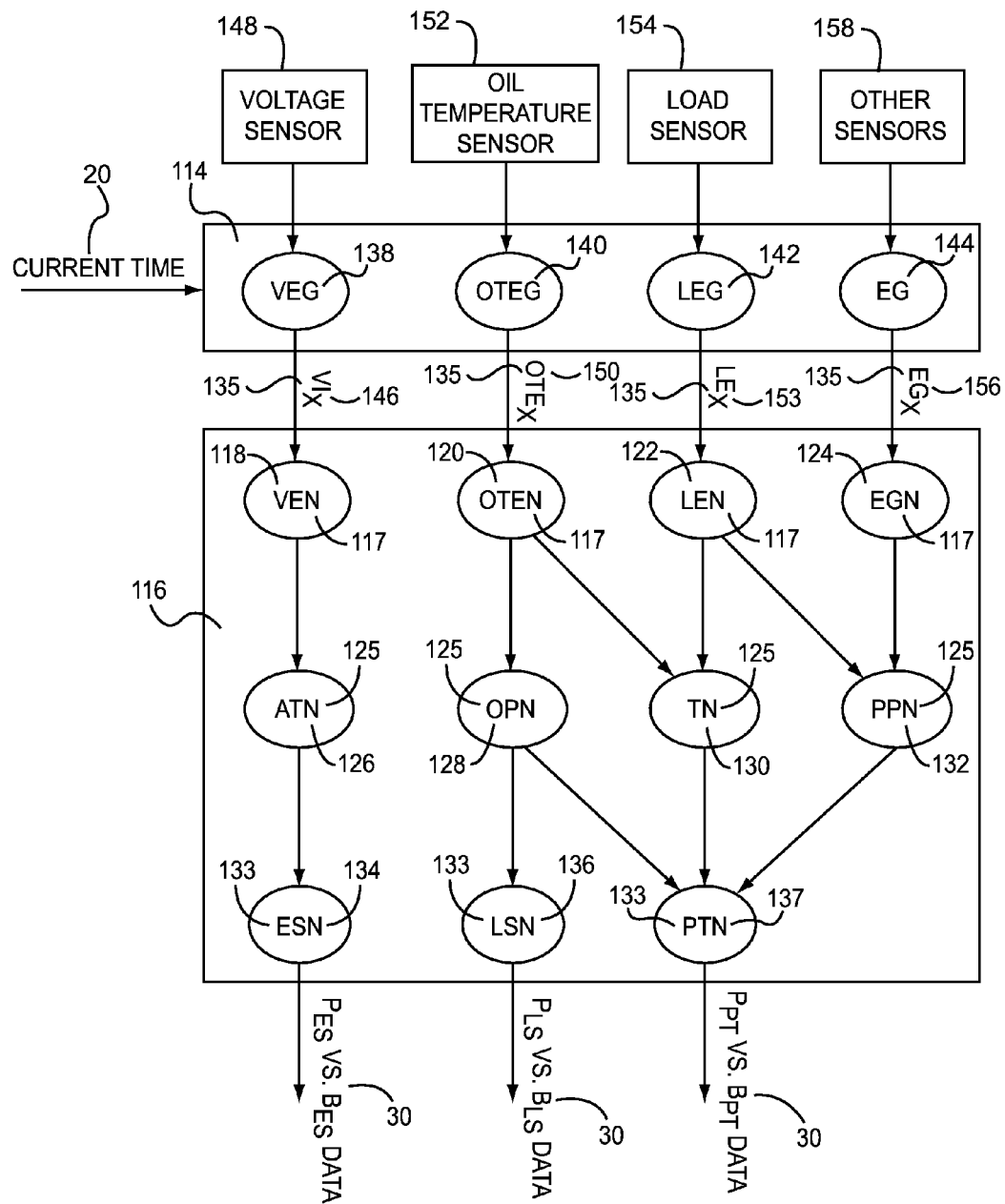

FIG. 7 illustrates one embodiment of the Learning Network that has an observation layer and a functional relations layer, and illustrates fusing of RUL data.

Figure 8:
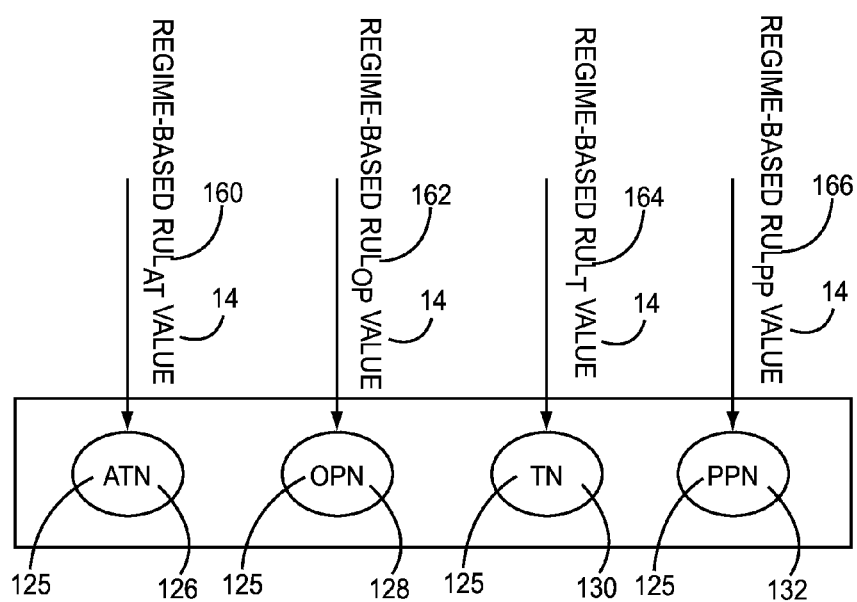

FIG. 8 illustrates regime-based $RUL_c$ values being input into apparatus component nodes from the functional relations layer shown in FIG. 7.

Figure 9:
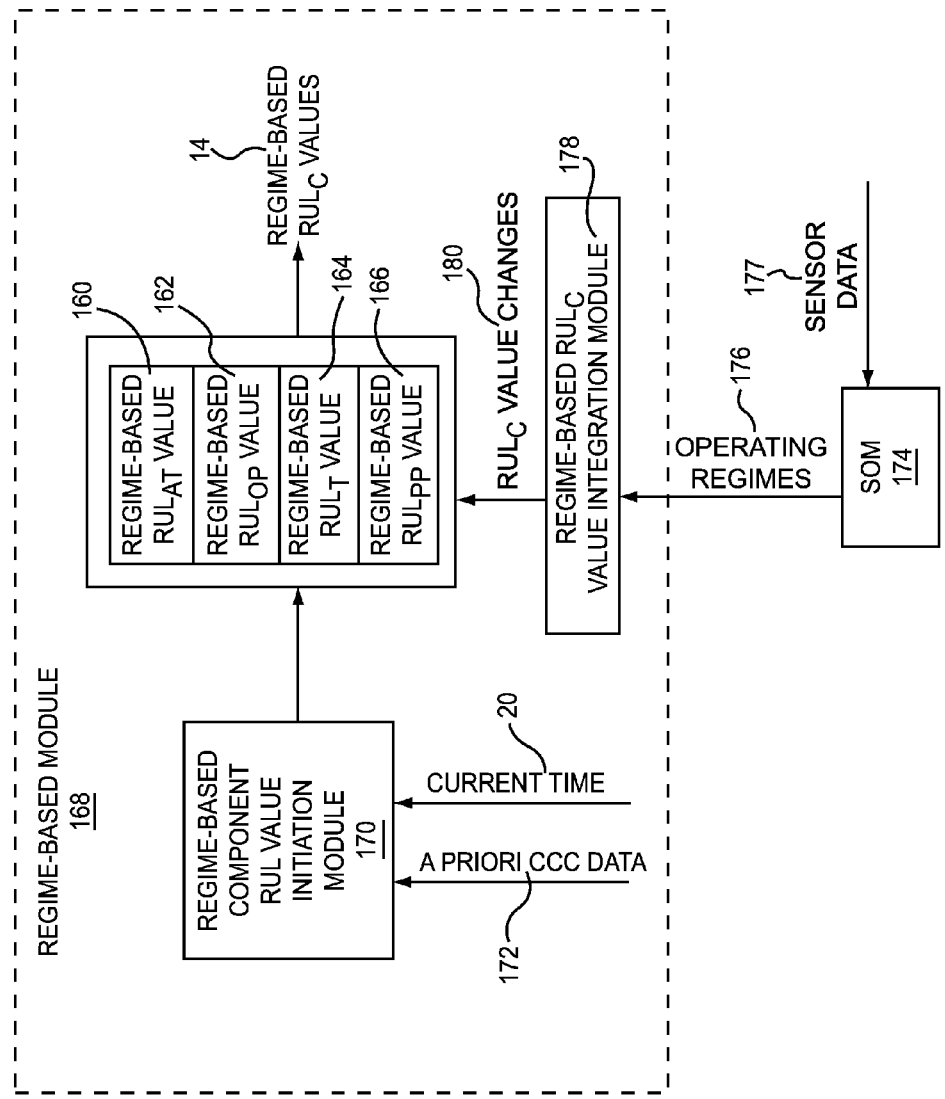

FIG. 9 illustrates one embodiment of a regime-based module configured to generate the regime-based $RUL_c$ values shown in FIG. 8.

Figure 10:
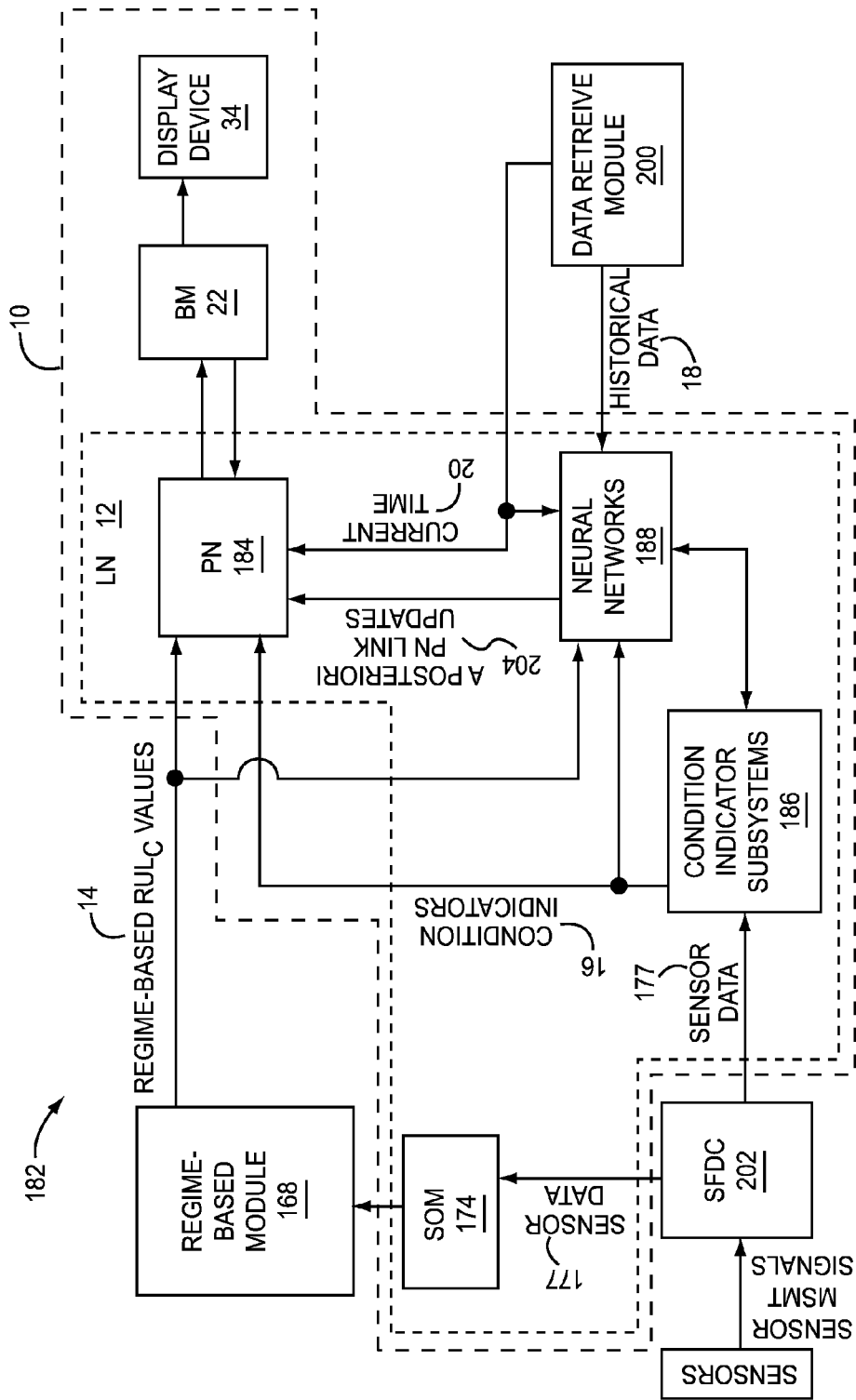

FIG. 10 is a RUL system that has one embodiment of the RUL estimation module shown in FIG. 2 along with other related components.

Figure 11:
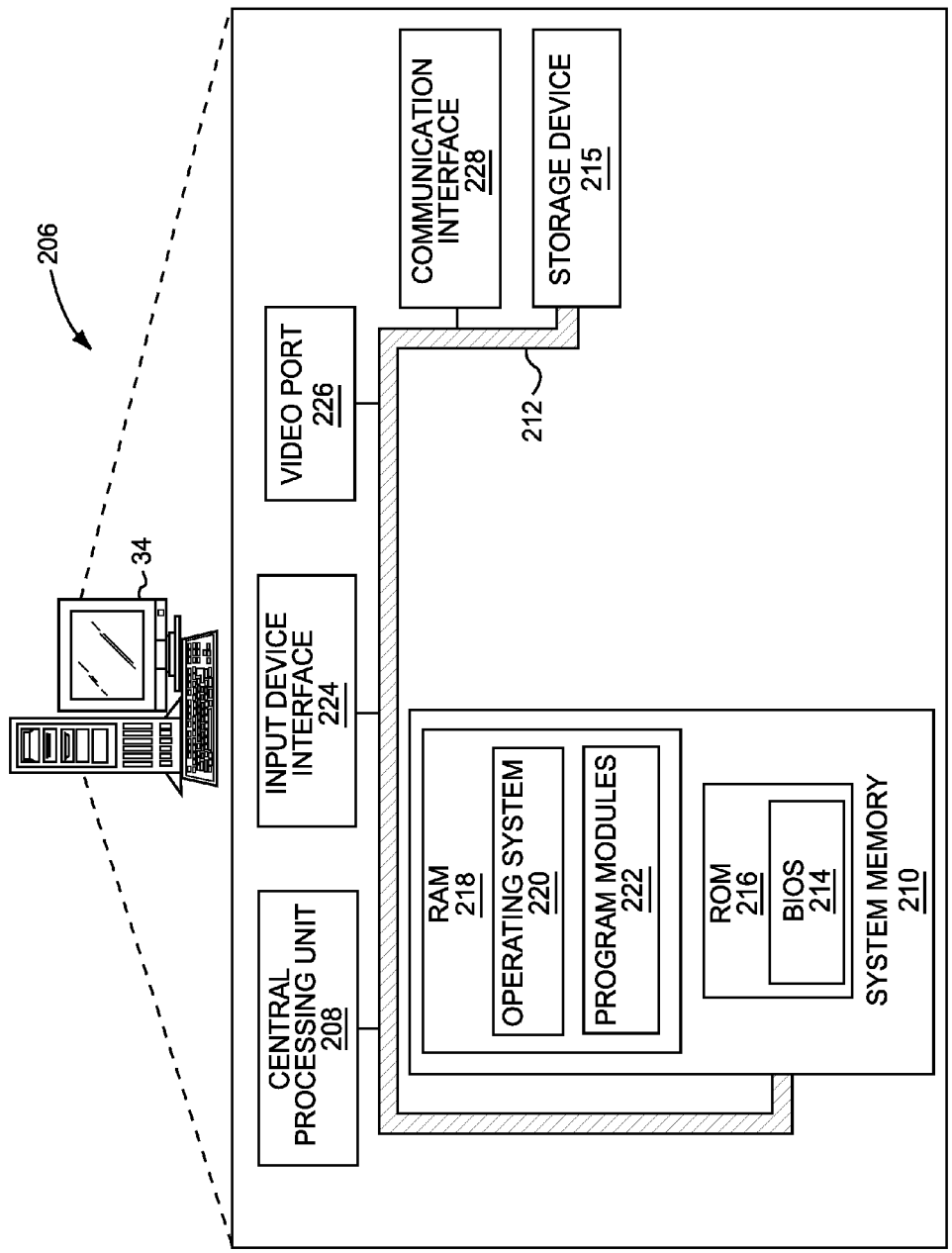

FIG. 11 is a block diagram of a computer device suitable to implement the RUL estimation module and the RUL system shown in FIGS. 2 and 10.

Figure 12:
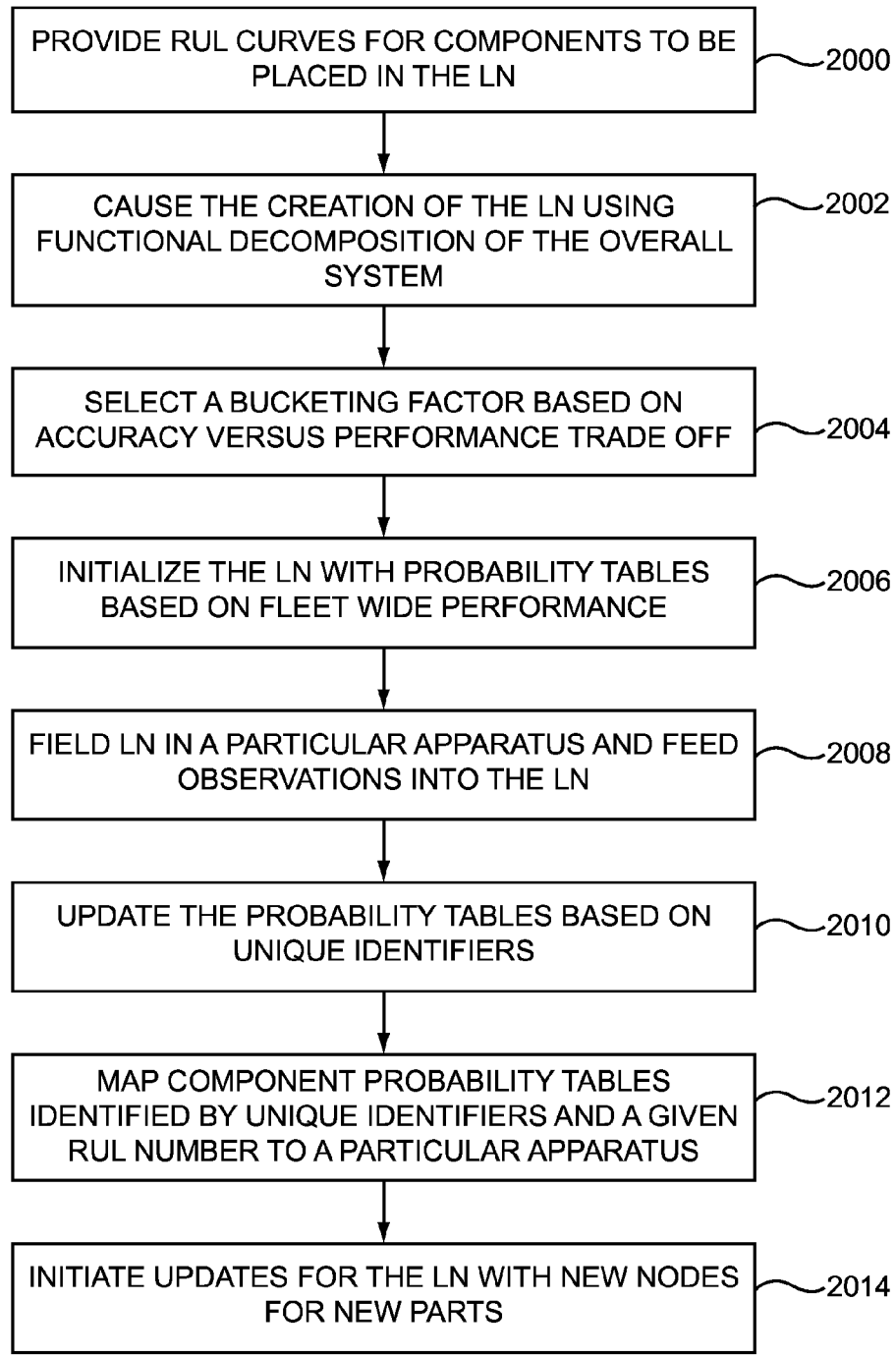

FIG. 12 illustrates another embodiment of a method for estimating a RUL of an apparatus.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

This disclosure relates generally to systems and methods for estimating a remaining useful life of an apparatus. The apparatus may be any device considered to have a limited life span. For example, the apparatus may be a vehicle (e.g., an automobile, an airplane, a helicopter, a ship, a submarine, or the like), a robot, a missile, a firearm, a radar system, and/or the like. The apparatus may also be an apparatus included within a machine, such as a vehicle. For example, the apparatus may be a vehicle management system, an electrical system, an engine, a transmission for the engine, a power train, a cooling system, a lubrication system, and/or the like. In addition, the apparatus may be a passive component included within a machine, such as a tire, a bearing landing skid, a landing float, a bolt, a rotor, a propeller, a wing, a vertical stabilizer, a horizontal stabilizer, a fin, a drive shaft, a fuselage, a mast, a door, a stabilizer bar, a chassis, a hose, a lubricant, and/or the like. Finally, the apparatus may be combinations of several machines, combinations of machines and passive components, combinations of passive components, and/or the like. For example, the electrical system of a vehicle may include an alternator as an apparatus component of the electrical system. The power train of a vehicle may include a transmission and a power plant as apparatus components.

A remaining useful life (RUL) is the amount of usage remaining for an apparatus. The usage relevant to the RUL may depend on the design, purpose, and utility of the apparatus. Embodiments described throughout this disclosure may be configured to use RUL to help plan for maintenance and know ahead of time that an apparatus is about to fail. Consequently, maintenance can be provided based on the conditions observed for an apparatus rather than simply through maintenance schedules derived from statistical data about a population of apparatuses of the same type. Generally, a RUL value identifies the RUL by providing an approximation of the remaining usage for the apparatus in units, such as credits, points, time left before failure, tallies, currency values, levels, and/or any other type of unit capable of identifying the RUL of an apparatus.

Figure 1:
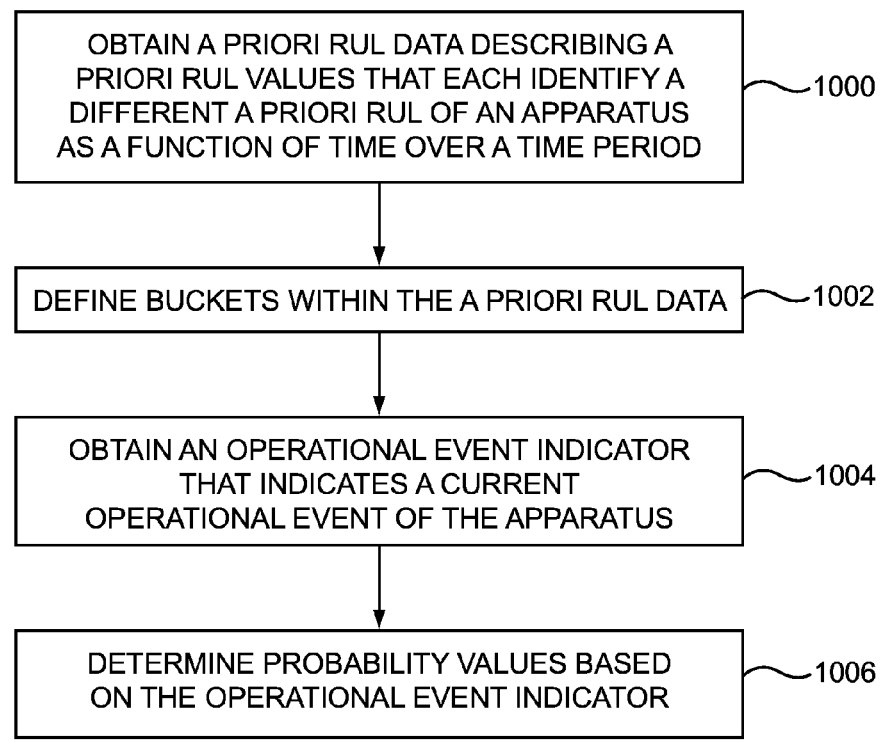
FIG. 1 is a flowchart illustrating an embodiment of a method for estimating a remaining useful life (RUL) of an apparatus.

FIG. 1 illustrates procedures that may be utilized to implement one embodiment of a method of estimating the RUL of an apparatus. As explained in further detail below, the procedures shown in FIG. 1 may be implemented by an RUL estimation module. To estimate the RUL of an apparatus, the RUL estimation module may initially obtain a priori RUL data describing a priori RUL values that each identify a different a priori RUL of the apparatus as a function of time over a time period (procedure 1000). The a priori RUL data is considered "a priori" since the a priori RUL data has been determined from historical data of a population of other apparatuses of the same apparatus type. Furthermore, the a priori RUL values are a priori because the a priori RULs of the apparatus being identified are determined analytically from the historical data. The time period may temporally extend from a starting time to some ending time displaced from the starting time. For instance, the starting time may designate a time of installation, manufacture, and/or initiation of operation. The ending time may be an arbitrarily selected time after installation. The a priori RULs of the apparatus that are identified by the a priori RUL values may therefore be generalized RULs calculated from the historical behavior of other apparatuses of the same apparatus type. The time period of the a priori RUL data may thus be a historical time period determined in accordance with the historical data.

Next, the RUL estimation module may define buckets within the a priori RUL data (procedure 1002). Each of the buckets may correspond to a different set of the a priori RUL values among various sets of the a priori RUL values. In addition, the set of the a priori RUL values for each bucket corresponds to a different time segment of the time period. The time period may thus include various time segments so that each of the time segments corresponds to one of the sets of a priori RUL values. Once the buckets of the a priori RUL data have been defined, the RUL estimation module may receive an operational event indicator that indicates a current operational event of the apparatus (procedure 1004). Some embodiments of the RUL estimation module may receive various types of operation event indicators each indicating different current operational events of the apparatus. For example, the operational event indicators may be regime-based RUL values of apparatus components in the apparatus, condition indicators indicating current operating conditions of the apparatus, maintenance suggestions for the apparatus, and other types of heuristics. The RUL estimation module then determines probability values based on the operational event indicator (procedure 1006). Each probability value quantifies a probability that the current RUL value identifying a current RUL of the apparatus is within a different one of the buckets. If various operational event indicators have been received, embodiments of the RUL estimation module may determine the probability values based on the various operational event indicators. Consequently, the probability values may be utilized to more accurately estimate the current RUL value of the apparatus. In some embodiments, a visual representation of the probability values is presented on a display device. In this manner, appropriate personnel may be informed of the probability that the current RUL value of the apparatus is in one of the buckets.

For example, without the probability values, personnel may have estimated the current RUL value as identifying an RUL correlated with required maintenance. However, personnel may view the visual representation of the probability values and conclude that buckets of the a priori RUL data correlating with repair may be associated with low probabilities. Personnel may therefore decide to delay maintenance on the apparatus. On the other hand, without the probability values, personnel may have estimated the current RUL value as identifying an RUL not correlated with the required maintenance. Nevertheless, personnel may view the visual representation of the probability values and conclude that maintenance is actually required. Policies may be developed so that personnel know whether or not to provide maintenance using the probability values. Maintenance to the machine may require repair or replacement of a subsystem and/or repair or replacement of a component of a subsystem.

FIG. 2 illustrates a block diagram of one embodiment of an RUL estimation module 10 configured to estimate the RULs of apparatuses. In this case, the apparatuses are subsystems in a vehicle. For example, one embodiment of the RUL estimation module 10 is configured to estimate the RULs of each of six subsystems in a helicopter, namely: a vehicle management system (VMS), an electrical system, a power train, a lubrication system, a control system, and a structural system. A computer device may be adapted to provide the RUL estimation module 10 and may be mounted on the vehicle so that the RUL of the apparatuses can be estimated while the vehicle is in operation.

In this embodiment, the RUL estimation module 10 may implement an artificial intelligence network, such as a Learning Network (LN) 12, to determine the probability values. The LN 12 obtains operational event indicators, which in this example are regime-based $RUL_C$ values 14 and condition indicators 16. Each of the plurality of operational event indicators indicates an operational event related to the apparatus. For example, the regime-based $RUL_C$ values 14 may each be usage credits assigned to apparatus components of the various apparatuses in the vehicle. The LN 12 may comprise any suitable type of learning network, including, for example, one or more of a Bayesian network, a neural network, a heuristic model, a stochastic model, decision tree learning, genetic programming, support vector machines, reinforcement learning, a regression model, a Gaussian mixture model, and/or the like.

The apparatuses may have apparatus components to provide functionality to that apparatus and there may be apparatus components that are common to the apparatuses. For example, in one embodiment of the RUL estimation module 10 for the helicopter, an oil pump (e.g., apparatus component) may be considered common to both the lubrication system (e.g., apparatus) and the power train (e.g., apparatus). Thus, the regime-based $RUL_C$ value 14 of the oil pump may be an operation event indicator of both the lubrication system and the power train. In one embodiment, the usage credits of the and regime-based $RUL_C$ values 14 are expended at different rates during operation, depending on the manner of operation and/or time duration since installation of the apparatus components. Initially, the regime-based $RUL_C$ values 14 can be determined analytically through the use of an RUL curve for the apparatus component, but, as explained in further detail below, updated empirically depending on how the apparatuses have been used. The condition indicators 16 are consolidated parameters that have been derived from sensor data to describe a current operating condition of one or more of the apparatuses. As explained in further detail below, the LN 12 may learn to fuse the sensor data into the consolidated parameters from historical data 18. The LN 12 may correlate parts and systems based on unique identifiers. For example, a part number and/or a serial number may be used.

Each operational event indicator may have an operational event value to indicate the current operational event of one or more of the apparatuses. For example, each one of the condition indicators 16 may have a condition indicator value to indicate the current operating condition of one or more of the apparatuses and apparatus components. Similarly, each one of the regime-based $RUL_C$ values 14 identifies an $RUL_C$ of one of the apparatus components. The operational event value of the operational event indicator may be one of various possible values for the operational event indicator. The various possible operational event values of the operational event may be determined from the historical data 18. Thus, obtaining the operational event indicator in one of the possible operational event values indicates the current operation event of the apparatus. For instance, each one of the condition indicators 16 may have various possible condition indicator values. By obtaining the condition indicator 16 in one of the possible condition indicator values, the condition indicator 16 indicates the current operating condition of one or more of the apparatuses. Similarly, each one of the regime-based $RUL_C$ values 14 may identify various possible regime-based RULs of the apparatus component. By obtaining the regime-based $RUL_C$ values 14 as identifying one of the various possible regime-based $RUL_C$s, the regime-based $RUL_C$ values 14 identifies the current regime-based $RUL_C$ of the apparatus component.

The LN 12 may determine the probability values using operational event indicators as a posteriori conditions. In other words, for each of the probability values, the probability quantified is a conditional probability that the current RUL value is in the one of the plurality of buckets given that the operation event indicator has the operation event value. Accordingly, the LN 12 can more accurately estimate the RUL of the apparatus because the probability values are determined in light of operational events occurring or that have occurred to the apparatus. It should be noted that while these operational event indicators are used as a posteriori conditions to determine the probability values, the operational event indicators themselves may be determined a priori (analytically), a posteriori (empirically), or a mixture of both. For example, the regime-based $RUL_C$ values 14 may initially be considered to have been determined a priori from the historical data 18 but are updated (adding new nodes and updating existing nodes) a posteriori given the current operating regime of the apparatuses. On the other hand, the condition indicators 16 may be considered a posteriori since they are determined empirically. However, using the operational event indicators as a posteriori conditions does not refer to how the knowledge regarding these operational event indicators was acquired. Rather, the operational event indicators are used as a posteriori conditions because they are given conditions that are assumed to have occurred in order to determine probability values. The LN 12 may organize information based on a unique identifier, such as, by way of non-limiting example, a part number and/or a serial number.

In this embodiment, the LN 12 may also input a current time 20. The current time 20 may be measured relative to a time of installation, a time of manufacture, or a time or initial operation of the apparatuses and/or maintenance of the apparatuses and subcomponents. In some embodiments, the current time 20 is utilized as a time for all of the operation event indicators, such as the regime-based $RUL_C$ values 14 and condition indicators 16. Alternatively, a current time of each or some of the operation event indicators may be provided with the operational event indicators. For example, each of the condition indicators 16 may be input with a current time. As explained in further detail below, the LN 12 may learn to go forward and backward in time using the operational event indicators.

The RUL estimation module 10 is operably associated with a bucketing module (BM) 22 that may initially obtain sets of a priori bathtub curve data 24 during a set-up process. In the embodiment of the RUL estimation module 10 related to the helicopter, the a priori bathtub curve data 24 includes a data describing a bathtub curve for each of the subsystems of the helicopter as a function of time. For instance, the bathtub curve may describe a number of expected errors for the subsystem over a period of time, such as over the subsystem's expected lifetime. From the a priori bathtub curve data 24, a priori RUL data may be derived by the BM 22. Any known and suitable technique may be utilized for converting a priori bathtub curve data 24 into a priori RUL data. In some embodiments, the a priori RUL data may be derived simply by calculating an inverse of the bathtub curve. Alternatively, the BM 22 may be configured to simply receive the sets of the a priori RUL data for each of the subsystems, rather than receiving a priori bathtub curve data and then deriving the a priori RUL data as described above.

For each set of the a priori RUL data, the a priori RUL data describes a priori RUL values of one of the subsystems. The a priori RUL values each identify a different a priori RUL of one of the subsystems as a function of time over a time period. The buckets are defined for each of the sets of the a priori RUL data using a bucketing factor (BF) 26. Alternatively, there may be bucketing factors for each of the sets of the a priori RUL data.

In this embodiment, the BM 22 is operable to provide sets of mean RUL values "$RUL_B$ values" 28 for the buckets of each set of the a priori RUL data. Each set of the $RUL_B$ values 28 include $RUL_B$ values corresponding to the buckets of a different one of the sets a priori RUL data. For example, in the embodiment related to the helicopter, one set of the $RUL_B$ values 28 include $RUL_B$ values for the buckets of the set of a priori RUL data related to the VMS, for the buckets of the set of a priori RUL data related to the electrical system, for the buckets of the set of a priori RUL data related to the power train, for the buckets of the set of a priori RUL data related to the lubrication system, for the buckets of the set of a priori RUL data related to the control system, and for the buckets of the set of a priori RUL data related to the structural system. Once the $RUL_B$ values 28 and BF 26 for the buckets of each set of the LN 12 has the elemental data defining the buckets. Generally, the recalculation of the $RUL_B$ values 28 is not required after the LN 12 has been set-up for particular sets of a priori RUL data since the LN 12 has information necessary for the buckets. Nevertheless, the BM 22 may repeat the above-described procedures, if updated a priori bathtub curve data 24 or a priori RUL data is received. Also, the BM 22 for new sets of a priori bathtub curve data 24 or a priori RUL data to set up probability nodes for new apparatuses being monitored by the RUL estimation module 10. The LN 12 may update probability tables based on unique identifiers, such as, by way of non-limiting example, a part number and/or a serial number.

The sets of $RUL_B$ values 28 and the BF 26 are input to the LN 12 to set-up the probability nodes of the LN 12 using the historical data 18. Once the probability nodes of the LN 12 have been set-up, the operation event indicators may indicate the current operational events of the first apparatus to be received by the LN 12. In this manner, sets of probability values are determined for the buckets of each set of a priori RUL data. For each set of probability values, the probability values may quantify a conditional probability that a current RUL value identifying a current RUL of one of the apparatus is within a different one of buckets. The LN 12 may package each set of probability values in a different set of probability value versus bucket data "P vs. B data" 30. Each of the sets of the P vs. B data 30 describes a different set of probability values in relation to the buckets of the corresponding set of a priori RUL data. Thus, if there are multiple apparatuses being monitored, each set of P vs. B data 30 corresponds to the probability values of a different one the apparatuses.

In this embodiment, the sets of P vs. B data 30 are output by the LN 12 to an output module (OM) 31. From the sets of P vs. B data 30, the OM 31 may generate a display output 32 to effect presentation of at least one visual representation. The OM 31 transmits the display output 32 to a display device 34. The display device 34 presents one or more visual representations in accordance to the display output 32. In one embodiment, one visual representation is used to represent all of the sets of P vs. B data 30. In other embodiments, different sets of P vs. B data 30 may be represented by different visual representations.

FIG. 3 visually expresses one embodiment of one of the sets of a priori RUL data 36 for one of the apparatuses. A priori RUL values of the a priori RUL data 36 are illustrated in FIG. 3 as being part of a continuous RUL curve for the apparatus. In practice however, the a priori RUL values of the a priori RUL data 36 are discrete. In this example, the a priori RUL values are quantified in RUL points. Buckets 38, 40, 42 are defined within the a priori RUL data 36. Each of the buckets 38, 40, 42 corresponds to a different set 44, 46, 48, respectively, of the a priori RUL values of the a priori RUL data 36. Furthermore, each set 44, 46, 48, of the a priori RUL values corresponds to a different time segment 50, 52, 54, respectively, of a time period 56. As shown in FIG. 3, the a priori RUL data 36 describes the a priori RUL values as a function of time over the time period 56. To define each of the buckets 38, 40, 42, the BF 26 (shown in FIG. 2) is obtained by the BM 22 (shown in FIG. 2). The BF 26 may represent a maximum variance and the each of sets 44, 46, 48 may be selected by determining that a set variance of each of sets 44, 46, 48 is less than or equal to the BF 26. For example, each of the sets 44, 46, 48 may be determined by going through the a priori RUL values moving forward in time (from left to right along the a priori RUL data 36 shown in FIG. 3). When the set variance at a particular a priori RUL value exceeds the BF 26, the previous a priori RUL value ends the set 44. The sets 46, 48 may be determined in a similar fashion. Since the BF 26 determines the number of buckets, the BF 26 thus allows for the control of a tradeoff between accuracy and being able to calculate the probability values for each bucket in real-time. The BF 26 may be selected automatically by the compute device or may be based on user input from a user.

Furthermore, the $RUL_B$ values 28 (in particular, one of the sets of the $RUL_B$ values 28 shown in FIG. 2) for the apparatus may be calculated from the sets 44, 46, 48 of the a priori RUL values. Each of the $RUL_B$ values 28 (for this apparatus) is a mean of a different one of the sets 44, 46, 48 of the a priori RUL values. As a result, each of the buckets 38, 40, 42, is defined since each of the $RUL_B$ values 28 (for this apparatus) is the mean for one of the buckets 38, 40, 42, and the BF 26 represents the maximum variance of each of the buckets 38, 40, 42. While this embodiment has three buckets 38, 40, 42, other embodiments may have any number of buckets depending on the BF 26.

Referring now to FIG. 4, FIG. 4 represents one embodiment of probability nodes 58, 60 of the LN 12 shown in FIG. 2. Each of the probability nodes 58, 60 may store probability tables 62, 64, respectively. The probability node 58 is an operational event indicator node (OEIN). As a collection, the probability tables 62, 64 may be referred to as a conditional probability table. The probability table 62 stored by the probability node 58 includes probability values, P(OEI=1)=0.8, P(OEI=0)=0.2 that each quantify a probability that an operational event indicator (OEI) has one of the possible operational event values. For the sake of simplicity, the operational event indicator is assumed to have one of two possible values, one (1), and zero (0). However, the operational event indicator may have any number of possible values that indicate any number of operational events.

The probability node 60 is an apparatus node (APN). The probability table 64 stored by the probability node 60 may include probability values, P(RUL=$RUL_{B1}$|OEI=1)=0.7, P(RUL=$RUL_{B1}$|OEI=0)=0.25, P(RUL=$RUL_{B2}$|OEI=1)=0.75, P(RUL=$RUL_{B2}$|OEI=0)=0.3 that a RUL value (RUL) is one of the means, $R_{B1}$, $R_{B2}$, determined from buckets. These probability values are for illustrative purposes only and may vary. For the sake of simplicity and by way of non-limiting example, only two buckets and thus two means $R_{B1}$, $R_{B2}$, are assumed. However, as explained above, the BF 26 (shown in FIG. 2) may be selected so that any numbers of buckets are provided. Each of the probability values P(RUL=$RUL_{B1}$|OEI=1)=0.7, P(RUL=$RUL_{B1}$|OEI=0)=0.25, P(RUL=$RUL_{B2}$|OEI=1)=0.75, P(RUL=$RUL_{B2}$|OEI=0)=0.3 quantifies a probability of the RUL value of an apparatus is one of the means $R_{B1}$, $R_{B2}$ provided the operational event indicator (OEI) has one of the possible operational event values, OEI=1, OEI=0. A link 66 represents a causal and effect relationship between the probability node 58 (root node) and the probability node 60 (leaf node) thereby indicating that the operation event indicator of the operation event indicator node (OEIN) is a cause and the RUL value of the apparatus node (APN) being one of the two means $R_{B1}$, $R_{B2}$ is the effect.

In one embodiment, the probability tables 62, 64 are initialized using historical data 18 (shown in FIG. 2) for other apparatuses of the same type as the apparatus being monitored using the $RUL_B$ values 28 (for the apparatus shown in FIG. 2) and the BF 26. Subsequently, an operational event indicator 68 is obtained that indicates a current operational event of the apparatus. The operational event indicator 68 may indicate the current operational event by having the operational event value, $OEI_x$, which is one of the possible operational event values, OEI=1, OEI=0. The $OEI_x$ is utilized as an a posteriori condition.

For example, assume that the operational event value, $OEI_x$ is equal to one (1). To determine the probability values for each bucket based on the operational event indicator 68, the two probabilities P(RUL=$RUL_{B1}$|OEI=1)=0.7, and P(RUL=$RUL_{B2}$|OEI=1)=0.75 are selected from the probability values P(RUL=$RUL_{B1}$|OEI=1)=0.7, P(RUL=$RUL_{B1}$|OEI=0)=0.25, P(RUL=$RUL_{B2}$|OEI=1)=0.75, P(RUL=$RUL_{B2}$|OEI=0)=0.3 of the probability table 64 given that the operational event value, $OEI_x$ of one (1) indicates the current operational event of the apparatus. The probability values P(RUL=$RUL_{B1}$|OEI=1)=0.7, and P(RUL=$RUL_{B2}$|OEI=1)=0.75, may be packages in one of the sets of P vs. B data 30 for the apparatus. In this embodiment, the probability value P(RUL=$RUL_{B1}$|OEI=1)=0.7 quantifies the probability that a current RUL value identifying a current RUL of the apparatus is within the bucket, B1. On the other hand, the probability value P(RUL=$RUL_{B2}$|OEI=1)=0.75 quantifies the probability that the current RUL value identifying the current RUL of the apparatus is within the bucket, B2. Note that the probability values P(RUL=$RUL_{B1}$|OEI=1)=0.7, P(RUL=$RUL_{B1}$|OEI=0)=0.25, P(RUL=$RUL_{B2}$|OEI=1)=0.75, P(RUL=$RUL_{B2}$|OEI=0)=0.3 were all calculated prior to determining that the probability value P(RUL=$RUL_{B1}$|OEI=1)=0.7 and probability value P(RUL=$RUL_{B2}$|OEI=1)=0.75) quantify the probability that the current RUL value is within one of the buckets, B1, B2. In essence, the probability quantified by each of the probability values P(RUL=$RUL_{B1}$|OEI=1)=0.7, P(RUL=$RUL_{B2}$|OEI=1)=0.75) is the conditional probability that the current RUL value is within the BF 26 (maximum variance shown in FIG. 2) of the means, $RUL_{B1}$, $RUL_{B2}$, respectively, given that the operational event indicator 68 has the operational event value, $OEI_x$ of one (1).

Subsequently, another updated operational event indicator (not shown) may be obtained that indicates an updated current operational event of the apparatus. For instance, assume that the updated operational event indicator is now obtained having an updated operational event value of zero (0). In this example, the two probabilities P(RUL=$RUL_{B1}$|=0)=0.25, and P(RUL=$RUL_{B2}$|OEI=0)=0.3 are selected from the probability values P(RUL=$RUL_{B1}$|OEI=1)=0.7, P(RUL=$RUL_{B1}$|OEI=0)=0.25, P(RUL=$RUL_{B2}$|OEI=1)=0.75, P(RUL=$RUL_{B2}$|OEI=0)=0.3 of the probability table 64 given that the updated operational event value of one (0) indicates the current operational event of the apparatus. The LN 12 may update probability tables based on a unique identifier, such as, by way of non-limiting example, a part number and/or serial number.

It should be noted that the description above is related to a static implementation of the probability nodes 58, 60. However, in another embodiment, the probability nodes 58, 60 may also be implemented dynamically. For example, probabilistic inferences may be computed provided a posteriori conditions of other probability nodes (not shown). For example, another operational event node (not shown) related to other types of operational events may be linked to the probability node 58 and/or the probability node 60. The other operational event may have received hard evidence (a posteriori conditions to indicate a current operational event) and/or soft evidence (a probability table of the other operational event indicator node has changed). As a result, the probability table 62 of the probability node 58 may be change based on the probability values from the other operational event indicator node.

Assume again that the probability tables 62, 64 were initiated as shown in FIG. 4 and that the operational event indicator 68 is obtained having the operational event value $OEI_x$ is one (1). In this case however, the operational event probability values P(OEI=1), P(OEI=0) are dynamically calculated by the probability node 58. The operational event probability values P(OEI=1), P(OEI=0) are then propagated to other linked probability nodes. In particular, due to the link 66, the P(RUL=$RUL_{B1}$|OEI=1) and P(RUL=$RUL_{B2}$|OEI=1) of the probability table 64 are calculated based on the P(OEI=1). The probability value P(RUL=$RUL_{B1}$|=0) and P(RUL=$RUL_{B2}$|OEI=0) of the probability table 64 are again calculated based on the based on the P(OEI=0). In this case, the probability node 60 is the leaf node so the propagation of the P(OEI=1), P(OEI=0) stops (at least for this branch of probability nodes 58, 60). Accordingly, the probability values P(RUL=$RUL_{B1}$|OEI=1) and P(RUL=$RUL_{B2}$|OEI=1) have been mapped to the means, $RUL_{B1}$, $RUL_{B2}$ of the buckets. Consequently, the probability values P(RUL=$RUL_{B1}$|OEI=1) and P(RUL=$RUL_{B2}$|OEI=1) are output as a set of the P vs. B data 30 for the apparatus. Note that the dynamic calculation of the P(RUL=$RUL_{B1}$|OEI=1) and P(RUL=$RUL_{B2}$|OEI=1) quantify the probability that a current RUL value identifying a current RUL of the apparatus is within one the buckets, B1, B2.

Referring now to FIG. 5, FIG. 5 represents another embodiment of probability nodes 70, 72, 74 of the LN 12 shown in FIG. 2. Each of the probability nodes 70, 72, 74 may store probability tables 76, 78, 80, respectively. The probability node 70 is a type of operational event indicator node, which in this example is a condition indicator node (CIN). The probability table 76 stored by the probability node 70 includes probability values, $P(CI=1)=0.8$, $P(CI=0)=0.2$ that a condition indicator (CI) has one of the possible condition indicator values, one (1) or zero (0). For the sake of simplicity and by way of non-limiting example, the condition indicator is assumed to have one of two possible values one (1) and zero (0). However, the condition indicator may have any number of possible values depending on the various possible operating conditions of an apparatus.

Next, the probability node 72 is another type of operational event indicator node, which in this example is an apparatus component node (APCN) for an apparatus component of the apparatus. The probability table 78 stored by the probability node 72 includes probability values, $P(RUL_C=RUL_{CA}|CI=1)=0.7$, $P(RUL_C=RUL_{CA}|CI=0)=0.25$, $P(RUL_C=RUL_{CB}|CI=1)=0.75$, $P(RUL_C=RUL_{CB}|CI=1)=0.3$. The probability values, $P(RUL_C=RUL_{CA}|CI=1)=0.7$, $P(RUL_C=RUL_{CA}|CI=0)=0.25$, $P(RUL_C=RUL_{CB}|CI=1)=0.75$, $P(RUL_C=RUL_{CB}|CI=1)=0.3$ quantify the probability that a regime-based RUL component value ($RUL_c$) of the apparatus component has one of two possible values, $RUL_{CA}$, $RUL_{CB}$, provided that the condition indicator is either equal to one (1) or zero (0). In this case, the regime-based RUL component value ($RUL_c$) is assumed to have two possible values, $RUL_{CA}$, $RUL_{CB}$ for the sake of simplicity. In other embodiments, the regime-based RUL component value ($RUL_c$) may have any number of possible values.

The probability node 74 is an apparatus node (APN) for the apparatus. The probability table 80 stored by the probability node 60 includes probability values,
$P(RUL=RUL_{B1}|RUL_C=RUL_{CA}, CI=1)=0.9$,
$P(RUL=RUL_{B1}|RUL_C=RUL_{CA}, CI=0)=0.96$,
$P(RUL=RUL_{B1}|RUL_C=RUL_{CB}, CI=1)=0.97$,
$P(RUL=RUL_{B1}|RUL_C=RUL_{CB}, CI=1)=0.98$,
$P(RUL=RUL_{B2}|RUL_C=RUL_{CA}, CI=1)=0.1$,
$P(RUL=RUL_{B2}|RUL_C=RUL_{CA}, CI=0)=0.04$,
$P(RUL=RUL_{B2}|RUL_C=RUL_{CB}, CI=1)=0.03$,
$P(RUL=RUL_{B2}|RUL_C=RUL_{CB}, CI=1)=0.02$ quantifying a probability that a RUL value (RUL) of the apparatus is one of the means, $R_{B1}$, $R_{B2}$, determined from buckets, B1, B2. For the sake of simplicity, only two buckets, B1, B2, and thus two means $R_{B1}$, $R_{B2}$, are assumed. However, as explained above, the BF 26 may be selected so that any numbers of buckets are provided. In this embodiment, each of the probability values
$P(RUL=RUL_{B1}|RUL_C=RUL_{CA}, CI=1)=0.9$,
$P(RUL=RUL_{B1}|RUL_C=RUL_{CA}, CI=0)=0.96$,
$P(RUL=RUL_{B1}|RUL_C=RUL_{CB}, CI=1)=0.97$,
$P(RUL=RUL_{B1}|RUL_C=RUL_{CB}, CI=1)=0.98$,
$P(RUL=RUL_{B2}|RUL_C=RUL_{CA}, CI=1)=0.1$,
$P(RUL=RUL_{B2}|RUL_C=RUL_{CA}, CI=0)=0.04$,
$P(RUL=RUL_{B2}|RUL_C=RUL_{CB}, CI=1)=0.03$,
$P(RUL=RUL_{B2}|RUL_C=RUL_{CB}, CI=1)=0.02$ quantifies a conditional probability of the RUL value being one of the means $R_{B1}$, $R_{B2}$ provided the condition indicator has one of two possible condition indicator values one (1) and zero (0) and the regime-based RUL component value is assumed to have two possible values, $RUL_{CA}$, $RUL_{CB}$.

A link 82 represents a causal and effect relationship between the probability node 70 (root node) and the probability node 72 (root node). In turn, a link 84 represents a causal and effect relationship between the probability node 70 (root node) and the probability node 72. Thus, the condition indicator is considered to be a cause of the regime-based $RUL_c$ component value and the regime-based $RUL_c$ component value is considered a cause of the RUL value of the apparatus. In this case, the probability node 70 is a parent node of the probability node 72, which is considered a child node of the probability node 70. The probability node 72 is a parent node of the probability node 74, which is considered a child node of both the probability node 70 and the probability node 72. The probability tables 76, 78, 80, may have been set-up previously based on historical data 18 (shown in FIG. 2)

During operation of the apparatus, a condition indicator 86 is obtained by the probability node 70. The condition indicator 86 has a condition indicator value, $C_x$, which indicates a current operating condition of the apparatus by having one of the possible condition indicator values, one (1) or zero (0). A current regime-based $RUL_c$ component value 88 is obtained that has a value of $RUL_{Cx}$. The values $RUL_{Cx}$ is one of the possible regime-based $RUL_C$ values, $RUL_{CA}$, $RUL_{CB}$. As described above with regards to the probability nodes 58, 60 in FIG. 4, the probability values quantifying a (conditional) probability that a current RUL value identifies a current RUL within one of the buckets B1, B2 may be determined statically or dynamically. If static, the probability values may simply be selected from the $P(RUL=RUL_{B1}|RUL_C=RUL_{CA}, CI=1)=0.9$, $P(RUL=RUL_{B1}|RUL_C=RUL_{CA}, CI=1)=0.96$,
$P(RUL=RUL_{B1}|RUL_C=RUL_{CB}, CI=1)=0.97$,
$P(RUL=RUL_{B1}|RUL_C=RUL_{CB}, CI=1)=0.98$,
$P(RUL=RUL_{B2}|RUL_C=RUL_{CA}, CI=1)=0.1$,
$P(RUL=RUL_{B2}|RUL_C=RUL_{CA}, CI=0)=0.04$,
$P(RUL=RUL_{B2}|RUL_C=RUL_{CB}, CI=1)=0.03$,
$P(RUL=RUL_{B2}|RUL_C=RUL_{CB}, CI=1)=0.02$ of the probability table 80 given that the condition indicator 86 has the condition indicator value, $C_x$, and the current regime-based $RUL_c$ component value 88 has the value of $RUL_{Cx}$.

In other embodiments, the probability values are determined dynamically. For example, the probability values $P(CI=1)$, $P(CI=0)$ of the probability table 76 may be determined dynamically in accordance with the condition indicator value, $C_x$ of the condition indicator 86. The probability values $P(CI=1)$, $P(CI=0)$ are then propagated to the probability node 72. The probability node 72 then updates the $P(RUL_C=RUL_{CA}|CI=1)$, $P(RUL_C=RUL_{CA}|CI=0)$, $P(RUL_C=RUL_{CB}|CI=1)$, $P(RUL_C=RUL_{CB}|CI=1)$ of the probability table 78 based on the probability values $P(CI=1)$, $P(CI=0)$. The probability values $P(RUL_C=RUL_{CA}|CI=1)$, $P(RUL_C=RUL_{CA}|CI=0)$, $P(RUL_C=RUL_{CB}|CI=1)$, $P(RUL_C=RUL_{CB}|CI=1)$ are then propagated to the probability node 74. The probability node 74 then updates the
$P(RUL=RUL_{B1}|RUL_C=RUL_{CA}, CI=1)$,
$P(RUL=RUL_{B1}|RUL_C=RUL_{CA}, CI=0)$,
$P(RUL=RUL_{B1}|RUL_C=RUL_{CB}, CI=1)$,
$P(RUL=RUL_{B1}|RUL_C=RUL_{CB}, CI=1)$,
$P(RUL=RUL_{B2}|RUL_C=RUL_{CA}, CI=1)$,
$P(RUL=RUL_{B2}|RUL_C=RUL_{CA}, CI=0)$,
$P(RUL=RUL_{B2}|RUL_C=RUL_{CB}, CI=1)$,
$P(RUL=RUL_{B2}|RUL_C=RUL_{CB}, CI=1)$ of the probability table 80. Here the propagation stops since the probability node 74 is a leaf node. The appropriate probability values from the probability table 80 are then provided by the probability node 74 in a set of P vs. B data 30 that corresponds to the apparatus. The probability values in the set of P vs. B data 30 each quantify the conditional probability that the current RUL value identifies the current RUL of the apparatus within one of the buckets, $R_{B1}$, $R_{B2}$, given that the condition indicator 86 has the value $RUL_{Cx}$. The LN 12 may update probability tables based on a unique identifier, such as, by way of non-limiting example, a part number and/or serial number.

In other implementations, the regime-based $RUL_C$ component value 88 causes the probability values $P(RUL_C=RUL_{CA}|CI=1)$, $P(RUL_C=RUL_{CA}|CI=0)$, $P(RUL_C=RUL_{CB}|CI=1)$, $P(RUL_C=RUL_{CB}|CI=1)$ of the probability table 78 to be updated and propagated through the LN 12. The propagation may be only cause to effect reasoning where the probability values $P(RUL_C=RUL_{CA}|CI=1)$, $P(RUL_C=RUL_{CA}|CI=0)$, $P(RUL_C=RUL_{CB}|CI=1)$, $P(RUL_C=RUL_{CB}|CI=1)$ are only propagated to child nodes, such as probability node 74 of the apparatus. On the other hand, the propagation may also include effect to cause reasoning $P(RUL_C=RUL_{CA}|CI=1)$, $P(RUL_C=RUL_{CA}|CI=0)$, $P(RUL_C=RUL_{CB}|CI=1)$, $P(RUL_C=RUL_{CB}|CI=1)$ are also propagated to the parent nodes, such as probability node 70. Consequently, in some cases, the link 82 may have inverted causal interpretations. Similarly, the link 84 may also have inverted causal interpretations. In still another implementation, probabilistic inferences may be computed provided a posteriori conditions of other probability nodes (not shown). For example, the LN 12 may include other condition indicator nodes, apparatus component nodes, and/or apparatus nodes. These other operational events may have received hard evidence (a posteriori conditions to indicate a current operational event) and/or soft evidence (a probability table of the other operational event indicator node has changed). As a result, the probability tables 76, 78, 80, may be change based on the probability values from the other operational event indicator node.

FIG. 6 illustrates another embodiment of different sets 90, 92, 94 of probability nodes (referred to generically as element 95 and specifically as elements 96, 98 100, 102, 104, 106, 108, 110, 112) that may be provided by the LN 12. In particular, FIG. 6 illustrates what is meant by the LN 12 learning to go forward and backwards through time. There may be various implementations of learning to go forward and backwards through time, which each may be implemented with the different sets 90, 92, 94 of probability nodes 95. Each set 90, 92, 94, includes a condition indicator node (CIN) 96, 98, 100, respectively, an apparatus component node (APCN) 102, 104, 106, respectively, and an apparatus node (APN) 108, 110, 112, respectively. The condition indicator nodes 96, 98, 100 are all for the same condition indicator. The apparatus component nodes 102, 104, 106 are each for the same apparatus component. Furthermore, the apparatus component node 102, 104, 106 is for the same apparatus. However, each of the sets 90, 92, 94 is associated with a different historical time, $t_0$, $t_1$, $t_2$ (or historical time ranges that include the historical times $t_0$, $t_1$, $t_2$). While there are three sets 90, 92, 94, shown in FIG. 6, there may be any number of sets 90, 92, 94 associated with any number of different historical times. The probability tables of each of the probability nodes 95 may be initialized using the historical data 18 (shown in FIG. 2). Once initialized, the current time 20 may be obtained during the operation of the apparatus.

In a static implementation, a relationship between the current time 20 and the historical times $t_0$, $t_1$, $t_2$ is fixed. Consequently, the current time 20 corresponds to one of the historical times $t_0$, $t_1$, $t_2$. To determine the probability values of the apparatus, the LN 12 selects a particular set 90, 92, 94 of the probability nodes 95. The selected set 90, 92, 94 is the set associated with a particular historical time $t_0$, $t_1$, $t_2$ that corresponds to the current time 20. The LN 12 then simply follows the links from cause nodes to effect nodes to determine the probability values from a probability table of the selected. The LN 12 then simply follows the links from cause to effect nodes in the particular set 90, 92, and 94. In this manner, the LN 12 selects the appropriate probability values from the apparatus component node (APCN) 102, 104, 106, of the apparatus node 108, 110, 112 of the particular set 90, 92, and 94 given the operational event values of the operational event indicators. For example, the operational event values of this embodiment are a condition indicator value of the condition indicator and a regime-based $RUL_C$ value of the apparatus component.

In one dynamic implementation, the LN 12 goes backwards and forwards in time based on the operational event values of the operational event indicators. Particularly, the probability nodes 95 used to determine the probability values are selected given that the operational event indicators have the operational event values at the current time. For example, given that the condition indicator has the condition indicator value at the current time, a particular condition indicator node 96, 98, 100 is selected that corresponds to the condition indicator has the condition indicator value at the current time. The particular condition indicator node 96, 98, 100 then calculates probability values for its probability table. The probability values of the particular condition indicator node 96, 98, 100 are then propagated through the probability nodes 95. Similarly, given that the regime-based $RUL_C$ value has a particular value at the current time, a particular condition indicator node 96, 98, 100 is selected that corresponds to the apparatus component node 102, 104, 106 that corresponds to the regime-based $RUL_C$ value having the particular value at the current time. The particular apparatus component node 102, 104, 106 then calculates probability values for its probability table. The probability values of the apparatus component node 102, 104, 106 are then propagated through the probability nodes 95. Now, given that the condition indicator has the condition indicator value and the regime-based $RUL_C$ value has the particular value at the current time, a particular apparatus node 108, 110, 112 that corresponds to the condition indicator value and the regime-based $RUL_C$ value at the current time is selected. The probability values of the apparatus are then calculated from the particular apparatus node 108, 110, and 112.

In another dynamic implementation, the links between the probability nodes 95 are adjusted given that the condition indicator has the condition indicator value and the regime-based $RUL_C$ value has the particular value at the current time. Probability tables for the probability nodes are then calculated accordingly and propagated through the LN 12. Transitional behaviors can be described with sub models sharing variables over time.

Referring now to FIG. 7, FIG. 7 illustrates one embodiment of the LN 12 for the helicopter. The embodiment of the LN 12 in FIG. 7 has an observation layer 114 and a functional relations layer 116. The functional relations layer 116 includes various types of condition indicator nodes (referred to generically as element 117). In this example, the functional relations layer 116 includes a voltage event node (VEN) 118 related to voltage events of the helicopter, an oil temperature event node (OTEN) 120 related to oil temperature events of the helicopter, a load event node (LEN) 122 related to load events of the helicopter, and other condition indicator nodes (EGN) 124 related to other types of operational conditions of the helicopter. Also included in the functional relations layer 116 are various apparatus component nodes (referred to generically as element 125). The apparatus component nodes include an alternator node (ATN) 126 for an alternator of the helicopter, an oil pump node (OPN) 128 for an oil pump, a transmission node (TN) 130 for a transmission of the helicopter, and a power plant node (PPN) 132 for a power plant of the helicopter. The helicopter includes many more apparatus components and thus, apparatus components may be provided any number of these apparatus components.

Additionally, the functional relations layer 116 includes various apparatus nodes. In particular, the functional relations layer 116 includes various apparatus nodes (referred to generically as element 133). The apparatus nodes 133 include an electrical system node (ESN) 134, a lubrication system node (LSN) 136, and a power train system node (PTN) 137. Although not illustrated, the functional relations layer 116 may also include other apparatus nodes for other subsystems such as the VMS, the control system, and the structural system of the helicopter. The observation layer 114 is operable to generate various condition indicators (referred to generically as element 135) by fusing sensor data from various sensors. The observation layer 114 includes a voltage event generator node (VEG) 138, an oil temperature event generator node (OTEG) 140, a load event generator node (LEG) 142, and other event generator nodes (EG) 144. The voltage event generator node (VEG) 138 may be operable to generate a voltage event indicator 146 having a voltage event value, $VI_x$ that indicates a current voltage condition. The voltage event value $VI_x$ may be one of various possible voltage event values to indicate different types of voltage conditions. For example, the voltage event value, $VI_x$, in this embodiment indicates that the current voltage condition is a voltage over condition. There may be various other possible voltage event values for voltage normal conditions, or voltage under conditions. The voltage event generator node 138 is operably associated with a voltage sensor 148 that measures the voltages of the alternator of the helicopter.

Next, the oil temperature event generator node 140 may be operable to generate an oil temperature event indicator 150 having an oil temperature event value, $OTE_x$ that indicates a current oil temperature condition. The oil temperature event value $OTE_x$ may be one of various possible oil temperature event values to indicate different types of oil temperature conditions. For example, the oil temperature event value $OTE_x$, in this embodiment indicates that the current oil temperature is in a high oil temperature condition. There may be various other possible oil temperature event values for normal oil temperature conditions or low oil temperature conditions. The oil temperature event generator node 140 is operably associated with an oil temperature sensor 152 that measures oil temperatures on the helicopter.

In addition, the load event generator node 142 of the observation layer 114 may be operable to generate a load event indicator 153 having a load event value $LE_x$ that indicates a current load condition. The load event value $LE_x$ may be one of various possible load event values to indicate different types of load conditions. For example, the load event value $LE_x$, in this embodiment indicates that the current load is a load under condition. There may be other possible load event values such as for a load high condition. The load event generator node 142 is operably associated with a load sensor 154 that measures load of the helicopter.

Finally, the other operational condition nodes 144 of the observation layer 114 may be operable to generate other operational condition indicators 156 each having an operational condition value. In this case, the operational condition values are each represented by $EG_x$. Each of the operational condition values $EG_x$ indicates a current operating condition of the helicopter. Furthermore, each of the other operational condition indicators 156 may have various possible values. The other operational condition nodes 144 may be operably associated with other sensors 158.

To set up the observation layer 114 and the functional relations layer 116, sets of the a priori RUL data may be input for each of the apparatuses. For example, a set of a priori RUL data may be provided to the LN 12 for the electrical system. Another set of the a priori RUL data may be provided for the lubrication system. Yet another set of the a priori RUL data may be provided for the power train system. Similarly, other sets of the a priori RUL data may be provided for the VMS, the control system, and the structural system. In one embodiment, some of the sets of the a priori RUL data are derived from functional breakdown using class V IETM (Interactive Electronic Technical Manuals) of the helicopter. The a priori RUL data can also be derived from the a priori bathtub curve data 24, as discussed above. Each of the sets of a priori RUL data describes a priori RUL values that each identify a different a priori RUL of the one of the apparatuses as a function of time over a time period. In this embodiment, the set of a priori RUL data of the electrical system describes a priori RUL values that each identify a different a priori RUL of the electrical system as a function of time over a first historical time period. The set of a priori RUL data of the lubrication system describes a priori RUL values that each identify a different a priori RUL of the lubrication system as a function of time over a second historical time period. The set of a priori RUL data of the power train system describes a priori RUL values that each identify a different a priori RUL of the a priori system as a function of time over a third historical time period. Similarly, the sets of the a priori RUL data for the VMS, the control system, and the structural system each describe a priori RUL values as a function of time over a historical time period of the respective subsystem.

Buckets are defined in each set of the a priori RUL data using the BF 26 (shown in FIG. 2). Once the buckets have been defined, the observation layer 114 and the functional relations layer 116 may be initiated using the historical data 18 (shown in FIG. 2). The historical data 18 may include statistics determined from a priori a population of the same type of apparatuses and apparatus components of the helicopter. For example, the historical data 18 may include statistics from a fleet of the helicopters. The observation layer 114 may learn the various possible condition indicator values and how to generate the condition indicators 135. Vectors may be established so that the condition indicators 135 are provided to the appropriate condition indicator nodes 117. Furthermore, the links between the condition indicator nodes 117, the apparatus component nodes 125, and the apparatus nodes 133 may be established. The LN 12 thus learns the functional relationships between the various condition indicators 135, the apparatus components, and the apparatuses of the helicopter. Various different condition indicators 135 may be common to apparatus components. For example, the oil temperature event node 120 is common to both the oil pump node 128 and the transmission node 130 because the oil temperature functionally relates to both the oil pump and the transmission. Also, various different apparatus components may be common to different apparatuses. For instance, the oil pump is an apparatus component common to both the lubrication system and the power train. Therefore, the oil pump node 128 is linked to both the lubrication system node 136 and the power train system node 137. The probability tables of the condition indicator nodes 117, the apparatus component nodes 125, and the apparatus component nodes 133 may be initiated and propagated through the functional relations layer 116 using the historical data 18.

The current time 20 is also input into the observation layer 114. The current time 20 may be designated as the current time for all of the condition indicators 135. Alternatively, each of the condition indicators 135 may have separate current times according to the time of the sensor measurements of the sensors 148, 152, 154, 158.

The functional relations layer 116 provides links between the condition indicator nodes 117, the apparatus component nodes 125, and the apparatus nodes 133 of the helicopter. As explained in further detail below, the LN 12 may learn these links from the historical data 18 (shown in FIG. 2). The historical data 18 may include statistics that have been determined a priori from a population of the same type of apparatuses and apparatus components of the helicopter. The historical data 18 may also include a priori RUL data, similar to the a priori RUL data 36 for each of the apparatuses.

During operation of the helicopter, the apparatus nodes 133 may output different sets of the P vs. B data 30 given the a posteriori conditions. In this example, the electrical system node(s) 134 outputs $P_{ES}$ vs. $B_{ES}$ data of the electrical system, the lubrication system node(s) 136 outputs $P_{LS}$ vs. $B_{LS}$ data of the lubrication system, and the power train system node(s) 137 outputs $P_{PT}$ VS. $B_{PT}$ data of the power train system. Other apparatus nodes may output similar set of the P vs. B data 30 for the VMS, control system, and structural system of the helicopter.

FIG. 8 illustrates various regime-based $RUL_C$ values 14 being input into the apparatus component nodes 125. In particular, a current regime-based $RUL_{AT}$ value 160 that identifies a current regime-based RUL of the alternator is input into the alternator node 126. The oil pump node 128 inputs a current regime-based $RUL_{OP}$ value 162. The regime-based $RUL_{OP}$ value 162 identifies a current regime-based RUL of the oil pump in the helicopter. A current regime-based $RUL_T$ value 164 that identifies a current regime-based RUL of the transmission is input into the transmission node 130. Furthermore, the power plant node 132 inputs a current regime-based $RUL_{PP}$ value 166. The regime-based $RUL_{PP}$ value 166 identifies a current regime-based RUL of the power plant of the helicopter. Any number of other regime-based $RUL_C$ values may be input into other apparatus component nodes in the functional relations layer 116.

Although not specifically illustrated in FIGS. 7 and 8, it should be noted that additional apparatus nodes may be provided for the apparatus as a whole, such as for the helicopter as a whole. Thus, a priori RUL data may have been received or otherwise obtained for the helicopter. Buckets may be defined for this a priori RUL data. Probability nodes may be configured within the functional relations layer 116 and obtain probability values from the other probability nodes. Additionally, the probability nodes for the helicopter may be configured to receive condition indicators 135 from the observation layer 114. The probability nodes for the helicopter may be configured to output probability values of the buckets described within the a priori RUL data of the helicopter.

In fact, in some embodiments, the observations layer 114 and the functional relations layer 116 may be thought of, at least conceptually, as a hyperspace of probability nodes and event nodes. Probability values may be extracted from the probability nodes depending on what segment of the hyperspace is relevant for a particular application. The links between the probability nodes and the event nodes may extend through various "dimensions" of the hyperspace (including through a time dimension). Consequently, at least for some embodiments, cause and effect relationships described by the links between the probability nodes can be considered hyper-dimensional. The event nodes of the observation layer 114 can also be linked throughout the various dimensions of the hyperspace to provide the appropriate condition indicators 135 to the appropriate probability nodes. As a result, the relationships between the event nodes and the probability nodes for some embodiments can be described using hyper-dimensional vectors, if desired.

Referring now to FIG. 9, FIG. 9 illustrates one embodiment of a regime-based module 168 configured to provide the regime-based $RUL_C$ values 14 to the apparatus component nodes 125 shown in FIGS. 7 and 8. The regime-based $RUL_C$ values 14 are each initiated using a regime-based component RUL value initiation module 170. Thus, the regime-based $RUL_{AT}$ Value 160, the regime-based $RUL_{OP}$ value 162, the regime-based $RUL_T$ value 164, and the regime-based $RUL_{PP}$ value 166 may be initially determined from regime-based component RUL value initiation module 170. To initiate the regime-based $RUL_C$ values 14, the regime-based component RUL value initiation module 170 may receive a priori component consumption curve (CCC) data 172 for each apparatus component and the current time 20. Given a slope of the a priori CCC data 172 determined from the current time 20, the regime-based component RUL value initiation module 170 outputs the regime-based $RUL_C$ values 14, which are stored in memory.

In this embodiment, the LN 12 provides a Self-Organizing Map (SOM) 174 that is operable with the regime-based module 168. The SOM 174 can be thought of as sheets of a neural network. The nodes in the SOM 174 become specifically tuned to input patterns and discern various operating regimes 176 of the helicopter, other the apparatuses, and the apparatus components. To discern these operating regimes 176, the SOM 174 receives sensor data 177 from the sensors 148, 152, 154, 158 (shown in FIG. 7). The operating regimes 176 are then received by a regime-based $RUL_C$ value integration module 178. For each of the regime-based $RUL_C$ values 14, the regime-based $RUL_C$ value integration module 178 determines a $RUL_C$ value changes 180 based on the operating regimes 176. The regime-based $RUL_C$ values 14 are then output to the apparatus component nodes 125 shown in FIGS. 7 and 8. During the next iteration, the stored regime-based $RUL_C$ values 14 are updated based on the operating regimes 176. The learning process of the SOM 174 may be competitive and unsupervised, meaning that no training is required to define the correct output (or the node into which the input is mapped) for an input. In the learning process, the SOM 174 discovers the operating regimes 176 from patterns of the sensor data 177.

FIG. 10 illustrates one embodiment of an RUL system 182 that includes the RUL estimation module 10 of FIG. 2. Also illustrated is one embodiment of the LN 12. In this embodiment of the LN 12, the functional relations layer 116 (shown in FIG. 7) is provided by a Probability Network (PN) 184. The observation layer 114 (shown in FIG. 7) of the LN 12 is provided by condition indicator subsystems 186. The LN 12 also includes the SOM 174. In addition, the embodiment of the LN 12 shown in FIG. 10 includes a neural network 188. The neural network 188 receives the current time 20 and the historical data 18 from a data retrieve module 200. The data retrieve module 200 may also provide the a priori bathtub curve data 24 to the BM 22. Furthermore, the condition indicators 16 and the regime-based $RUL_c$ values 14 (i.e., the operational event indicators) are provided from the condition indicator subsystems 186 and the regime-based module 168.

In one embodiment of the PN 184, the PN 184 is configured so that there is a node that generates the probability of a subsystem's RUL for a bucket. Thus, for each set of a priori RUL data, the PN 184 may generate a vector of probability values each corresponding to one of the particular buckets for that particular set of a priori RUL data. So if the number of buckets in the particular set of a priori RUL data is represented by the integer N, the PN 184 may have N output probability nodes each configured for a particular bucket. The vector of probability values output may be interpreted to take corrective action before end of life. If the integer M represents the number of sets of a priori RUL data, and assuming simply for the sake of explanation that each set also has N number of buckets, the PN 184 may have an [M×N] number of output probability nodes. Thus, M vectors could be output each for the buckets of the a priori RUL data corresponding to a different component.

Alternatively, numerous PN, like the PN 184 shown in FIG. 10, may be provided for each of the bucket in the various sets of a priori RUL data. One entire PN may thus be trained to provide the probability value for a bucket. Numerous PNs can be set up for each bucket of every set of a priori RUL data.

In this embodiment, the condition indicator subsystems 186 may include a VMS condition indicator subsystem, an electrical condition indicator subsystem, a power train condition indicator subsystem, a lubrication condition indicator subsystem, a control indicator subsystem, and a structural condition indicator subsystem. Each of the condition indicator subsystems 186 may be implemented through the neural network 188, which in this embodiment is a dedicated neural network. The neural network 188 is trained to determine the condition indicators 16 using the historical data 18 recorded for the various apparatuses of the helicopter. In this manner, the neural network 188, in conjunction with the condition indicator subsystems 186, learns to fuse sensor data 177 into the condition indicators 16. Furthermore, the neural network 188 can adjust the condition indicator subsystems 186 based on the current time or, alternatively, based on a time of measurement from the sensor data 177. Hence, the neural network 188 can determine the condition indicators 16 of the helicopter in real-time. The neural network 188 also learns to go backwards and forwards in time based on the condition indicators 16 and the regime-based $RUL_c$ values 14.

The sensor data 177 is provided by a sensor fusion and data characterization module (SFDC) 202. In turn, the SFDC 202 is operably associated with sensors that are provided on the helicopter, such as the voltage sensor 148, oil temperature sensor 152, load sensor 154, and other sensors 158 (shown in FIG. 7). These sensors generate sensor measurement signals that are provided to the SFDC 202. The SFDC 202 may include analog and digital filters designed to help attenuate the effect of high-frequency noise in the sensor measurement signals. Conversions from analog to digital data may also be performed. In addition, data validation techniques may also be utilized to implement basic sanity checks and handle missing data. Also, data normalization may be implemented to scale the relevant data within normalization ranges.

Finally, the neural network 188 of FIG. 10 is operable to generate the a posteriori PN link updates 204 for the PN 184. These a posteriori PN link updates 204 may be generated based on the regime-based $RUL_C$ values 14, the condition indicators 16, and the current time 20. In one embodiment, the neural network 188 is a Fuzzy Adaptive Resonance Theory neural network. Using fuzzy logic, the a posteriori PN link updates 204 are generated using pattern recognition. The LN 12 may keep track of updates based on a unique identifier, such as, by way of non-limiting example, a part number and/or serial number.

FIG. 11 illustrates a device, in this case a computer device 206, configured to provide embodiments of the RUL estimation module 10 or the overall RUL system 182 of FIGS. 2 and 10. The computer device 206 may comprise, for example, a laptop computer; a desktop computer; a workstation; a server; or any other computer device capable of processing data and suitable instructions. The computer device 206 includes a central processing unit 208 having one or more microprocessors, a system memory 210, and a system bus 212. The system bus 212 provides an interface for system components including, but not limited to, the system memory 210 and the central processing unit 208. The central processing unit 208 can be any of various commercially available or proprietary central processing units.

The system bus 212 may be any of several types of bus structures that may further interconnect to a memory bus (with or without a memory controller), a peripheral bus, and/or a local bus using any of a variety of commercially available bus architectures. The system memory 210 may include non-volatile memory 216 (e.g., read only memory (ROM), erasable programmable read only memory (EPROM), electrically erasable programmable read only memory (EEPROM), etc.) and/or volatile memory 218 (e.g., random access memory (RAM)). A basic input/output system (BIOS) 214 may be stored in the non-volatile memory 216, and can include the basic routines that help to transfer information between elements within the computer device 206. The volatile memory 218 may also include a high-speed RAM, such as static RAM, for caching data. The computer device 206 may further include a storage device 215, which may comprise, for example, an internal hard disk drive (HDD) (e.g., enhanced integrated drive electronics (EIDE) or serial advanced technology attachment (SATA)) for storage, flash memory, or the like. The storage device 215 and associated computer-readable and computer-usable media provide non-volatile storage of data, data structures, computer-executable instructions, and so forth. Although the description of computer-readable media above refers to an HDD, it should be appreciated by those skilled in the art that other types of media that are readable by a computer, such as Zip disks, magnetic cassettes, flash memory cards, cartridges, and the like, may also be used in the operating environment, and further, that any such media may contain computer-executable instructions for performing novel methods of the disclosed architecture.

A number of program modules can be stored in the storage device 215 and in the volatile memory 218, including an operating system 220 and one or more program modules 222, which may implement the functionality described herein in whole or in part. It is to be appreciated that the embodiments can be implemented with various commercially available operating systems 220 or combinations of operating systems 220. All or a portion of the embodiments may be implemented as a computer program product, such as a non-transitory computer-usable or computer-readable medium having a computer-readable program code embodied herein. The computer-readable program code can include software instructions for implementing the functionality of the embodiments described herein that is executed on the central processing unit 208. The central processing unit 208, in conjunction with the program modules 222 in the volatile memory 218, may serve as a control system for the computer device 206 that is configured to, or adapted to, implement the functionality described herein. An administrator may be able to enter commands and information into the computer device 206 through one or more input devices, such as, for example, the display device 34 (which is a digital monitor in this embodiment); a keyboard; or a pointing device, such as a mouse (not illustrated). Other input devices (not illustrated) may include a microphone, an infrared (IR) remote control, a joystick, a game pad, a stylus pen, or the like. These and other input devices are often connected to the central processing unit 208 through an input device interface 224 that is coupled to the system bus 212, but can be connected by other interfaces such as a parallel port, an IEEE 1394 serial port, a game port, a universal serial bus (USB) port, an IR interface, etc. The computer device 206 may drive a separate or integral display device 34, which may also be connected to the system bus 212 via an interface, such as a video port 226. The computer device 206 preferably includes a communication interface 228 for communicating with a communication network.

FIG. 12 illustrates another embodiment of a method for estimating a RUL of an apparatus, such as a helicopter. In this embodiment, a user (i.e., a human or another computer) may generate RUL curves for components to be placed in the LN 12 (procedure 2000). The user may cause the creation of the LN 12 using functional decomposition of the overall system (i.e., the helicopter) (procedure 2002). For instance, this may be done through a functional breakdown from class V IETMs. Next, the user may select a bucketing factor based on accuracy versus a performance trade off (procedure 2004). The LN 12 may then be initialized with probability tables based on fleet wide performance (procedure 2006). The LN 12 may then be fielded in a particular apparatus (i.e. a particular helicopter) and observations may be fed into the LN 12 (procedure 2008). The LN 12 may update the probability tables based on unique identifiers, such as part numbers and/or serial numbers (procedure 2010). Then, the LN 12 may output probability tables and map component probability tables identified by unique identifiers and a given RUL number to a particular apparatus (procedure 2012). When new parts are placed into the system, the maintainer that performs the repair may initiate updates of the LN 12 with new nodes for new parts, and the probability tables may be updated based on failure of the subcomponents (procedure 2014). Procedures 2008-2014 may be repeated throughout the life of the overall system.

Those skilled in the art will recognize improvements and modifications to the preferred embodiments of the present disclosure. All such improvements and modifications are considered within the scope of the concepts disclosed herein and the claims that follow.

What is claimed is:

1. A method of estimating a remaining useful life (RUL) of a first apparatus, comprising:
   obtaining, by a computer device, first a priori RUL data describing first a priori RUL values that each identify a different a priori RUL of the first apparatus as a function of time over a first time period;
   defining a first plurality of buckets within the first a priori RUL data, each of the first plurality of buckets corresponding to a different set of the first a priori RUL values among a first plurality of sets of the first a priori RUL values such that each of the first plurality of sets corresponds to a different one of a first plurality of time segments in the first time period;
   obtaining a first operational event indicator that indicates a current operational event of the first apparatus; and
   determining a first plurality of probability values based on the first operational event indicator, wherein each of the first plurality of probability values quantifies a probability that a current RUL value identifying a current RUL of the first apparatus is within a different one of the first plurality of buckets.

2. The method of claim 1, wherein defining the first plurality of buckets within the first a priori RUL data further comprises calculating mean RUL values, each of the mean RUL values being a mean of a different set from the first plurality of sets of the first a priori RUL values.

3. The method of claim 2, wherein the first operational event indicator has a first operational event value to indicate the current operational event of the first apparatus and wherein determining the first plurality of probability values based on the first operational event indicator is such that, for each of the first plurality of probability values, the probability quantified is a conditional probability that the current RUL value corresponds to a different mean RUL value of the mean RUL values given that the first operational event indicator has the first operational event value.

4. The method of claim 3, further comprising:
   obtaining a bucketing factor representing a maximum variance; and
   wherein defining the first plurality of buckets within the first a priori RUL data comprises determining that each of the first plurality of sets has a set variance less than or equal to the bucketing factor.

5. The method of claim 4, wherein, for each of the first plurality of probability values, the probability quantified is a conditional probability that the current RUL value is within the bucketing factor of the different mean RUL value of the mean RUL values.

6. The method of claim 1, wherein:
   the first operational event indicator is a first condition indicator that has a first condition indicator value to indicate a current operating condition of the first apparatus and determining the first plurality of probability values is such that, for each of the first plurality of probability values, the probability quantified is a conditional probability that the current RUL value is within the different one of the first plurality of buckets given that the first operational event indicator has the first condition indicator value;
   the first apparatus comprises a first apparatus component and the method further comprises obtaining a regime-based RUL component value that identifies a component RUL of the first apparatus component; and
   for each of the first plurality of probability values, the conditional probability that the current RUL value is within the different one of the first plurality of buckets is further given the regime-based RUL component value of the first apparatus component.

7. The method of claim 1, further comprising:
   calculating a plurality of operational event probability values, wherein each of the plurality of operational event probability values quantifies a probability that the first operational event indicator has a different one of the plurality of possible operation event values, wherein the first operational event indicator has a first operational event value to indicate the current operational event of the first apparatus, the first operational event value being one of a plurality of possible operational event values and, wherein prior to determining the first plurality of probability values based on the first operational event indicator;
   calculating a second plurality of probability values based on the plurality of operational event probability values, wherein each of the second plurality of probability values quantifying a conditional probability that a RUL value identifying a RUL of the first apparatus is within a different bucket of the first plurality of buckets given a different possible operational event value of the plurality of possible operational event values, wherein the second plurality of probability values includes the first plurality of probability values and determining the first plurality of probability values comprises selecting the first plurality of probability values from the second plurality of probability values given that the first operational event value indicates the current operational event of the first apparatus;

obtaining a second operational event indicator that indicates an updated current operational event of the first apparatus; and determining a third plurality of probability values based on the second operational event indicator, wherein the second plurality of probability values includes the third plurality of probability values and each of the second plurality of probability values quantifies a probability that the current RUL value identifying the current RUL of the first apparatus is within a bucket of the first plurality of buckets.

8. The method of claim 7, wherein the second plurality of probability values each are associated with a historical time of a plurality of historical times and the method further comprises:

obtaining a current time; and wherein selecting the first plurality of probability values from the second plurality of probability values further comprises selecting the first plurality of probability values as a result of one or more historical times associated with the first plurality of probability values corresponding to the current time.

9. The method of claim 1, wherein determining the first plurality of probability values based on the first operational event indicator comprises implementing a learning network to determine the first plurality of probability values.

10. The method of claim 1, wherein the first operational event indicator is a first operational condition indicator that has a first condition indicator value to indicate a current operating condition of the first apparatus and the first apparatus including a first apparatus component, the method further comprising:

obtaining a first RUL component value that identifies a current component RUL of the first apparatus component; and wherein determining the first plurality of probability values is further based on the first RUL component value such that, for each of the first plurality of probability values, the probability is a conditional probability that the current RUL value identifies the current RUL of the first apparatus given the first RUL component value, and the first operational event indicator having the first condition indicator value to indicate the current operating condition of the first apparatus.

11. The method of claim 10, wherein a machine includes the first apparatus and a second apparatus, wherein the first apparatus component is common to both the first apparatus and the second apparatus, the method further comprising:

obtaining second a priori RUL data describing second a priori RUL values that each identify a priori RULs of the second apparatus as a function of time over a second time period;

defining a second plurality of buckets within the second a priori RUL data each of the second plurality of buckets corresponding to a different set of the second a prior RUL values among a second plurality of sets of the second a priori RUL values such that each of the second plurality of sets corresponds to a different one of a second plurality of time segments in the second time period; and determining a second plurality of probability values, wherein each of the second plurality of probability values quantifies a conditional probability that a second current RUL value identifying a second current RUL of the second apparatus is within one of the second plurality of buckets given that the first RUL component value.

12. A system comprising:

at least one microprocessor operably associated with at least one non-transitory computer readable medium wherein computer executable instructions instruct the at least one microprocessor to:

estimate, by an adaptive learning network, a component remaining useful life (RUL) curve based on sensed current operation conditions for each component of a plurality of components associated with at least one subsystem of a machine;

estimate, by the adaptive learning network, a system RUL curve based on current operation conditions of the at least one subsystem based on a fusion of the component RUL curves associated with said each component; and automatically adjusting the adaptive learning network to move backward or forward on the system RUL curve based on changes to at least one component or the at least one subsystem.

13. The system of 12, wherein the computer executable instructions instruct the at least one microprocessor to:

identify each component by a unique identifier and associated component RUL curve; and update the adaptive learning network based on maintenance updates to the at least one component; and estimate the system RUL curve based on the maintenance updates.

14. The system of 12, wherein the at least one subsystem comprises a plurality of subsystems and operational functionality of one or more subsystems of the plurality of subsystems shares one or more components; and wherein the computer executable instructions instruct the at least one microprocessor to:

fuse the component RUL curves of the one or more components for each subsystem of the plurality of subsystems to estimate the system RUL curve for said each subsystem.

* * * * *